US012587335B2

(12) United States Patent
Zhang et al.

(10) Patent No.: US 12,587,335 B2
(45) Date of Patent: Mar. 24, 2026

(54) SYSTEMS AND METHODS FOR INDICATING DEMODULATION REFERENCE SIGNAL PORTS FOR WIRELESS COMMUNICATION

(71) Applicant: ZTE Corporation, Shenzhen (CN)

(72) Inventors: Shujuan Zhang, Shenzhen (CN); Bo Gao, Shenzhen (CN); Meng Mei, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 263 days.

(21) Appl. No.: 18/529,494

(22) Filed: Dec. 5, 2023

(65) Prior Publication Data

US 2024/0204948 A1     Jun. 20, 2024

Related U.S. Application Data

(63) Continuation of application No. PCT/CN2022/074596, filed on Jan. 28, 2022.

(51) Int. Cl.
*H04L 5/00*          (2006.01)
(52) U.S. Cl.
CPC .................................... *H04L 5/005* (2013.01)
(58) Field of Classification Search
CPC ... H04L 27/2613; H04L 5/0019; H04L 5/005; H04L 5/0051; H04L 5/0091; H04L 5/0007; H04W 72/23
See application file for complete search history.

(56) References Cited

U.S. PATENT DOCUMENTS

| | | | |
|---|---|---|---|
| 2017/0201360 A1 | 7/2017 | Shin et al. | |
| 2018/0278395 A1* | 9/2018 | Yoon ...................... | H04L 5/0051 |
| 2018/0287756 A1* | 10/2018 | Xia ........................ | H04L 5/0048 |
| 2019/0068308 A1* | 2/2019 | Shin ...................... | H04L 5/0023 |
| 2019/0394004 A1* | 12/2019 | Xia ...................... | H04W 72/044 |
| 2020/0119874 A1* | 4/2020 | Liu ........................ | H04W 72/23 |
| 2020/0177338 A1* | 6/2020 | Zhang ................... | H04L 5/0048 |

(Continued)

FOREIGN PATENT DOCUMENTS

| | | |
|---|---|---|
| CN | 110418380 A | 11/2019 |
| CN | 110546911 A | 12/2019 |

(Continued)

OTHER PUBLICATIONS

"R18 MIMO Post-RAN1-113 Agreements"; May 2023 (Year: 2023).*

(Continued)

*Primary Examiner* — Benjamin H Elliott, IV
(74) *Attorney, Agent, or Firm* — Perkins Coie LLP

(57)          ABSTRACT

Presented are systems and methods for wireless communication. In one aspect, a wireless communication device determines a first demodulation reference signal (DMRS) table according to first information from a wireless communication node. In one aspect, the wireless communication device receives a value of a field in a signaling from the wireless communication node. In one aspect, the wireless communication device determines a first DMRS parameter according to the first DMRS table and the value of the field. In one aspect, the first DMRS table includes a mapping between values of the field of the signaling and values of the first DMRS parameter.

20 Claims, 5 Drawing Sheets

(56) References Cited

U.S. PATENT DOCUMENTS

| | | | | |
|---|---|---|---|---|
| 2020/0178281 | A1* | 6/2020 | Bhamri | H04W 72/0446 |
| 2020/0178287 | A1* | 6/2020 | Kim | H04W 72/23 |
| 2020/0179287 | A1* | 6/2020 | Medina | A61K 38/14 |
| 2020/0220681 | A1* | 7/2020 | Yang | H04L 5/001 |
| 2021/0167925 | A1* | 6/2021 | Qi | H04L 5/0053 |
| 2021/0168011 | A1* | 6/2021 | Davydov | H04J 11/005 |
| 2021/0235428 | A1* | 7/2021 | Zhang | H04L 5/0044 |
| 2022/0029762 | A1* | 1/2022 | Ren | H04J 13/0062 |
| 2022/0311574 | A1 | 9/2022 | Gao et al. | |
| 2022/0330282 | A1* | 10/2022 | Kim | H04L 1/1642 |
| 2024/0204948 | A1* | 6/2024 | Zhang | H04L 27/2613 |
| 2024/0396684 | A1* | 11/2024 | Khoshnevisan | H04L 5/0051 |

FOREIGN PATENT DOCUMENTS

| | | |
|---|---|---|
| CN | 110771232 A | 2/2020 |
| CN | 110945816 A | 3/2020 |
| CN | 111052662 A | 4/2020 |
| CN | 111183600 A | 5/2020 |
| JP | 2020-516158 A | 5/2020 |
| JP | 2022/520920 A | 4/2022 |
| KR | 10-2019-0133032 A | 11/2019 |
| WO | 2017111809 A1 | 6/2017 |
| WO | 2018/177194 A1 | 10/2018 |
| WO | 2021029753 A1 | 2/2021 |
| WO | 2023141942 A1 | 8/2023 |

OTHER PUBLICATIONS

"5G; NR; Physical channels and modulation (3GPP TS 38.211 version 16.7.0 Release 16)"; Oct. 2021 (Year: 2021).*

EPO, Extended European Search Report for European Application No. 22922786.3, mailed on Dec. 20, 2024, 8 pages.

International Search Report for International Application No. PCT/CN2022/074596, Mail Date: Oct. 18, 2022. 7 pages.

JPO, Office Action for Japanese Application No. 2023-575825, mailed on Aug. 14, 2025, 4 pages with unofficial English translation.

JPO, Notice of Reasons for Refusal for Japanese Application No. 2023-575825, mailed on Feb. 4, 2025, 22 pages with English translation.

CIPO, Office Action for Canadian Application No. 3,222,552, mailed on Feb. 17, 2025, 4 pages.

Interdigital, Inc. "PDSCH/PUSCH Enhancements for Supporting NR from 52.6 GHz to 71 GHz," 3GPP TSG RAN WG1 #106-e, e-Meeting, Aug. 16-27, 2021, R1-2106770.

Lenovo Motorola Mobililty, "PDSCH/PUSCH scheduling enhancements for NR from 52.6 GHz to 71GHz," 3GPP TSG RAN WG1 #106-e, e-meeting, Aug. 16-27, 2021, R1-2106835.

NTT Docomo, Inc.," PDSCH/PUSCH enhancements for NR from 52.6 to 71 GHz," 3GPP TSG RAN WG1 Meeting #106-e, Electronic Meeting, Aug. 16-27, 2021, R1-2107849.

Qualcomm Incorporated, "PDSCH and PUSCH enhancements for 52.6-71GHz band," 3GPP TSG-RAN WG1 #106bis-e, e-Meeting, Oct. 11-19, 2021, R1-2110176.

Qualcomm Incorporated, "PEnhancements on HST-SFN deployment," 3GPP TSG-RAN WG1 Meeting #107-e, e-Meeting, Nov. 11-18, 2021, R1-2112200.

Vivo,"Discussions on PDSCH PUSCH enhancements for NR operation from 52.6GHz to 71GHz," 3GPP TSG RAN WG1 #106bis, e-Meeting, Oct. 11-20, 2021, R1-2108963.

CNIPA, First Office Action for Chinese Application No. 202280046966.1, mailed on Sep. 18, 2025, 12 pages with unofficial English translation.

JPO, Notice of Allowance for Japanese Application No. 2023-575825, mailed on Nov. 18, 2025, 4 pages with unofficial English translation.

MOIP, Office Action for Korean Application No. 10-2023-7042400, mailed on Jan. 19, 2026, 8 pages with unofficial English translation.

Intel Corporation, "On the remaining details of DM-RS," 3GPP TSG RAN WG1 Meeting 91, Reno USA, Nov. 27-Dec. 1, 2027, R1-1720076, 19 pages.

\* cited by examiner

SYSTEMS AND METHODS FOR INDICATING DEMODULATION REFERENCE SIGNAL PORTS FOR WIRELESS COMMUNICATION

CROSS REFERENCE TO RELATED APPLICATIONS

This patent document is a continuation of and claims benefit of priority to International Patent Application No. PCT/CN2022/074596, filed on Jan. 28, 2022. The entire content of the before-mentioned patent application is incorporated by reference as part of the disclosure of this application.

TECHNICAL FIELD

The disclosure relates generally to wireless communications, including but not limited to systems and methods for indicating demodulation reference signal ports for wireless communication and supporting a larger number of demodulation reference signal (DMRS) ports.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium for wireless communication between a wireless communication node and a wireless communication device. In some embodiments, the wireless communication node is a base station or a transmit receive point (TRP). In some embodiments, the wireless communication device is user equipment (UE).

In some embodiments, a wireless communication device determines a first demodulation reference signal (DMRS) table according to first information from a wireless communication node. In some embodiments, the wireless communication device receives a value of a field in a signaling from the wireless communication node. In some embodiments, the wireless communication device determines a first DMRS parameter according to the first DMRS table and the value of the field. In some embodiments, the first DMRS table includes a mapping between values of the field of the signaling and values of the first DMRS parameter, and each of the values of the field is associated with a respective one of the values of the first DMRS parameter. In some embodiments, the first DMRS table includes the first DMRS parameter, that has values associated with at least two categories of DMRS ports, and different categories of the at least two categories of DMRS ports correspond to at least one of: different numbers of DMRS orthogonal frequency division multiplexing (OFDM) symbol groups of one time domain orthogonal cover code (TD-OCC), different numbers of DMRS OFDM symbols of one TD-OCC, different numbers of DMRS OFDM symbols in one DMRS OFDM symbol group of one TD-OCC, or different relationships between vectors of one TD-OCC. In some embodiments, each of the DMRS OFDM symbol groups includes one or more consecutive OFDM symbols.

In some embodiments, at least one of a gap exists between symbols of two adjacent DMRS OFDM symbol groups, the gap being greater than zero OFDM symbol, or at least some OFDM symbols in different DMRS OFDM symbol groups are non-consecutive with respect to each other.

In some embodiments, the at least two categories of DMRS ports include a first category DMRS port and a second category DMRS port. In some embodiments, a TD-OCC of the first category DMRS port corresponds to one DMRS OFDM symbol group and the second category DMRS port corresponds to X DMRS OFDM symbol groups. In some embodiments, X may be an integer value larger than 1.

In some embodiments, if the wireless communication device is configured with DMRS type I, and a maximum number of OFDM symbols in one OFDM symbol group is 1, the wireless communication device may determine Y DMRS ports selected from DMRS ports {0-3, 8, 9, 10, 11} according to the value of the first DMRS parameter. Y may be a positive integer value.

In some embodiments, if the wireless communication device is configured with DMRS type II, and a maximum number of OFDM symbols in one OFDM symbol group is 1, the wireless communication device may determine Y DMRS ports selected from DMRS ports {0-5, 12-17}. Y may a positive integer.

In some embodiments, if the wireless communication device is configured with DMRS type I, and a maximum number of OFDM symbols in one OFDM symbol group is 2, the wireless communication device may determine Y DMRS ports selected from DMRS ports {0-15} according to the value of the first DMRS parameter. Y may be a positive integer.

In some embodiments, if the wireless communication device is configured with DMRS type II, and a maximum number of OFDM symbols in one OFDM symbol group is 2, the wireless communication device may determine Y DMRS ports selected from DMRS ports {0-23}. Y may be a positive integer.

In some embodiments, the first DMRS parameter includes a number of code division multiplexing (CDM) groups without data and Y DMRS ports, if the Y DMRS ports include at least one of DMRS ports 8-15, and the number of CDM groups without data is a maximum value.

In some embodiments, the first DMRS parameter includes a number of DMRS OFDM symbols in one DMRS OFDM symbol group, and Y DMRS ports, if the Y DMRS ports include at least one of DMRS ports 8-15, and the number of DMRS OFDM symbols in one DMRS OFDM symbol group is a maximum value.

In some embodiments, DMRS ports 0-7 are first category DMRS ports and DMRS ports 8-15 are second category DMRS ports. In some embodiments, DMRS ports 0-7 are first category DMRS ports and second category DMRS ports, and DMRS ports 8-15 are second category DMRS ports. The first category DMRS ports and the second category DMRS ports of the DMRS ports 0-7 may have same DMRS port indices of 0-7.

In some embodiments, the first DMRS parameter includes a number of CDM groups without data and Y DMRS ports, if the Y DMRS ports include at least one of DMRS ports 12-23, the number of CDM group without data is a maximum value.

In some embodiments, the first DMRS parameter includes a number of DMRS OFDM symbols in one DMRS OFDM symbol group and Y DMRS ports, if the Y DMRS ports include at least one of DMRS ports 12-23, and the number of DMRS OFDM symbols in one DMRS OFDM symbol group is a maximum value.

In some embodiments, DMRS ports 0-11 are first category DMRS ports and DMRS ports 12-23 are second category DMRS ports. In some embodiments, DMRS ports 0-11 are first category DMRS ports and second category DMRS ports and DMRS ports 8-15 are second category DMRS ports. The first category DMRS ports and the second category DMRS ports of the DMRS ports 0-11 may have same DMRS port indices of 0-11.

In some embodiments, the first DMRS parameter includes Y DMRS ports and a number of CDM groups without data. In some embodiments, the number of CDM groups without data is determined according to at least one of a category of the Y DMRS ports, or a relationship between elements of one TD-OCC. In some embodiments, values of the first DMRS parameter of the first DMRS table do not include a first value of the number of CDM groups without data and a DMRS port of a second category. In some embodiments, the relationship between elements of one TD-OCC includes that whether the TD-OCC includes X repetition vectors which includes one or two elements.

In some embodiments, the number of CDM groups without data is further determined according to at least one of an index of a CDM group which includes the Y DMRS ports, or a relationship between elements of one TD-OCC. In some embodiments, the values of the first DMRS parameter of the first DMRS table does not include a first value of the number of CDM groups without data and a DMRS port of a second category.

In some embodiments, if the Y DMRS ports include at least one DMRS port of a second category, the number of CDM groups without data is a maximum value.

In some embodiments, the maximum value is 2 for a DMRS port of type I. In some embodiments, the maximum value is 3 for a DMRS port of type II.

In some embodiments, the first DMRS table includes the first DMRS parameter and satisfies at least one of: the first DMRS parameter includes Y DMRS ports, and the Y DMRS ports, which are associated with one value of the field belong to one of the at least two categories; the first DMRS parameter includes Y DMRS ports, and the Y DMRS ports, which are associated with one value of the field belong to more than one of the at least two categories; or the first DMRS parameter includes Y DMRS ports, and the at least two categories of DMRS ports are associated with different values of the field.

In some embodiments, the Y DMRS ports, which are associated with one value of the field belong to more than one of the at least two categories of DMRS ports, wherein at least one of: the more than one of the at least two categories of DMRS ports are in different CDM groups; DMRS ports in one CDM group and from the Y DMRS ports belong to one category of DMRS ports; the Y DMRS ports belong to one category of DMRS ports for one channel and belongs to different categories of DMRS ports for different channels; the Y DMRS ports belong to one category of DMRS ports for one channel, and the category of the Y DMRS ports of the one channel depends on a first indication; or the Y DMRS ports belong to one category of DMRS ports for one channel, and the one category of the Y DMRS ports depends on a total number of DMRS OFDM symbol groups of one transmission occasion of one channel.

In some embodiments, the first DRMS parameter includes a number of consecutive OFDM symbols in one orthogonal frequency division multiplexing (OFDM) symbol group, and Y DMRS ports. In some embodiments, the number of consecutive OFDM symbols in the one OFDM symbol group is determined by a category of the Y DMRS ports. In some embodiments, the values of the first parameter of the first DMRS table do not include: a first value of the number of consecutive OFDM symbols in the one OFDM symbol group, and a DMRS port of a second category.

In some embodiments, if the Y DMRS ports include a DMRS port of a second category, then a number of CDM groups without data is 2, and the number of consecutive OFDM symbols in the one OFDM symbol group is a maximum value.

In some embodiments, the first DMRS parameter includes the number of consecutive OFDM symbols in one orthogonal frequency division multiplexing (OFDM) symbol group, Y DMRS ports, and the number of consecutive OFDM symbols in the one OFDM symbol group. In some embodiments, if the Y DMRS ports include a second category DMRS port which corresponds to a same element of TD-OCC across multiple DMRS OFDM symbols of one DMRS OFDM symbol group, and do not include a DMRS port in CDM group 1, then the number of CDM groups without data is 1 or 2, and the number of consecutive OFDM symbols in the one OFDM symbol group is 1 or 2.

In some embodiments, the first DMRS parameter includes the number of consecutive OFDM symbols in one orthogonal frequency division multiplexing (OFDM) symbol group, Y DMRS ports and the number of consecutive OFDM symbols in the one OFDM symbol group. In some embodiments, for a same combination of Y DMRS ports which include a second DMRS port in CDM group 0 and does not include a DMRS port in CDM group 1, then there are four values in the first DMRS table each of which corresponds to a respective one of four combinations where: the number of CDM groups without data is 1 or 2, and the number of consecutive OFDM symbols in the one OFDM symbol group is 1 or 2. In some embodiments, the second category DMRS port corresponds to a same element of TD-OCC across multiple DMRS OFDM symbols of one DMRS OFDM symbol group.

In some embodiments, the first DMRS parameter includes the number of consecutive OFDM symbols in one orthogonal frequency division multiplexing (OFDM) symbol group, Y DMRS ports, and the number of consecutive OFDM symbols in the one OFDM symbol group. In some embodiments, for a same combination of Y DMRS ports which include a second DMRS port in CDM group 0 and does not include a DMRS port in CDM group 1, then there are two values in the first DMRS table each of which corresponds to a respective one of two combinations where: the number of CDM groups without data is 1 or 2, and the number of consecutive OFDM symbols in the one OFDM symbol group is 2. In some embodiments, the second category DMRS port corresponds to a same element of TD-OCC across multiple DMRS OFDM symbols of one DMRS OFDM symbol group.

In some embodiments, the signaling includes one of downlink control information (DCI) signaling, radio access control (RRC) signaling, or medium access control element (MAC-CE) signaling.

In some embodiments, the first DMRS parameter includes a number of code division multiplexing (CDM) groups without data, and Y DMRS ports, and if maximum number of OFDM symbols in one DMRS OFDM symbol group is larger than 1, the first DMRS parameter further comprises a number of consecutive OFDM symbols in one OFDM symbol group.

In some embodiments, in the case the Y DMRS ports are DMRS ports of a physical downlink shared channel (PDSCH), the first DMRS parameter further includes at least one of: a category of a DMRS port, a category of a DMRS port in a CDM group of multiple CDM groups without data, a relationship between categories of DMRS ports in different CDM groups of multiple CDM groups without data, or a length of a TD-OCC of the DMRS port in a CDM group of multiple CDM groups without data. In some embodiments, the DMRS port or the DMRS ports are from the Y DMRS ports of a channel of the wireless communication device, and/or the DMRS port or the DMRS ports include a DMRS port of a potentially co-scheduled wireless communication device of the wireless communication device.

In some embodiments, a number of bits in the field is determined by the first DMRS information. In some embodiments, the first DMRS table is selected from multiple tables according to the first information.

In some embodiments, the first information includes at least one of: a DMRS type between type I and type II, a maximum number of OFDM symbols in one DMRS OFDM symbol group, a second DMRS parameter, a total number of OFDM symbol groups included in one transmission occasion, or a number of DMRS ports. In some embodiments, different DMRS types correspond to different frequency domain patterns of a DMRS port.

In some embodiments, the second DMRS parameter is to indicate whether a second category DMRS ports is enabled. In some embodiments, the second DMRS parameter is to indicate whether a DMRS port includes a second category DMRS ports is enable. In some embodiments, the second DMRS parameter is a one bit parameter. In some embodiments, if the first table includes DMRS ports of a physical uplink shared channel (PUSCH) and the first information is used to select the first table, the first information includes the number of the DMRS ports.

In some embodiments, the first DMRS parameter includes Y DMRS ports. In some embodiments, the method further includes determining, by the wireless communication device according to a total number of OFDM symbol groups included in one transmission occasion, at least one of: a category of a DMRS port of the Y DMRS ports, or a length of a TD-OCC of a DMRS port of a co-scheduled wireless communication device in a different code division multiplexing (CDM) group.

In some embodiments, the first wireless communication device determines, according to the total number of OFDM symbol groups included in the one transmission occasion and the Y DMRS ports, at least one of: the category of the DMRS port of the Y DMRS ports, or the length of the TD-OCC of the DMRS port of the co-scheduled wireless communication device in the different CDM group.

In some embodiments, Y is smaller than 5 or 9.

In some embodiments, the at least two categories of DMRS ports are indexed together.

In some embodiments, the indices of DMRS ports are determined by first indexing across DMRS ports of a first category, then indexing across DMRS ports of a second category. In some embodiments, the first category DMRS ports and some second category DMRS ports share same DMRS port indices.

In some embodiments, if the DMRS ports of the first category and some DMRS ports of the second category share the same DMRS port indices, the TD-OCC of the some DMRS ports of the second category corresponds to X DMRS OFDM symbols and includes X repetitions of a same vector which has L elements. L may be a number of OFDM symbols in one OFDM symbol group. In some embodiments, if the first DMRS table includes Y DMRS ports of a physical uplink shared channel (PUSCH), there is no indication from the wireless communication node to indicate the category of DMRS ports with the same DMRS port indices. In some embodiments, if the first DMRS table includes Y DMRS ports of a physical downlink shared channel (PDSCH), the first DMRS parameter includes an indication to indicate the category of DMRS ports with the same DMRS port indices. In some embodiments, if the first DMRS table includes Y DMRS ports of the PDSCH, there is an indication from the wireless communication node to indicate the category of DMRS ports with the same DMRS port indices. In some embodiments, a category of DMRS ports with the same DMRS port indices is determined by a total number of DMRS OFDM symbol groups of one transmission occasion of one channel.

In some embodiments, the indication to indicate the category of DMRS ports with the same DMRS port indices comprises at least one of: an indication to indicate a number of DMRS OFDM symbol groups of the DMRS ports with the same DMRS port indices, an indication to indicate whether the number of DMRS OFDM symbol groups of the DMRS ports with the same DMRS port indices is larger than 1, or an indication to indicate a length of a TD-OCC of the DMRS ports with the same DMRS port indices.

In some embodiments, the at least two categories of DMRS ports include the first category DMRS port and the second category DMRS port. In some embodiments, a TD-OCC of the first category DMRS port corresponds to one OFDM symbol group and the second category DMRS port corresponds to X OFDM symbol groups. X may be an integer value larger than 1. In some embodiments, the first category DMRS port corresponds to a same TD-OCC across X OFDM symbol groups, if the first category DMRS port corresponds to the X OFDM symbol groups and the second category DMRS port corresponds to different TD-OCCs across the X OFDM symbol groups. In some embodiments, a length of the TD-OCC of the first category DMRS port is L and a length of a TD-OCC of the second category DMRS port is X*L, wherein L is a number of OFDM symbols in one OFDM symbol group.

In some embodiments, the wireless communication device determines, a sequence of at least two categories of DMRS ports according to $a_{k,l}^{(p,\mu)} = w_f(k')w_t(l')r(2*n+k')$, wherein: $k=4*n+2*k'+\Delta$, or $k=6*n+k'+\Delta$, where k is an index of a subcarrier; $l=\bar{l}+l'$, $l'=0, 1, \ldots, L-1$, where 1 is an OFDM symbol of a DMRS port P, l' is index of OFDM symbol in one OFDM symbol group, and L is a number of symbols in one OFDM symbol group; k'=0 or 1, is an intermediate parameter to determine an index of a subcarrier k of a DMRS; n comprises non-negative integer values; $w_f(k')$, $w_t(l')$, and $\Delta$ are provided by a defined table which includes a mapping between a number of DMRS ports and the $w_f(k')$, $w_t(l')$, and $\Delta$, where $w_f(k')$ is a FD-OCC, $w_t(l')$ is a TD-OCC, and $\Delta$ is a RE offset associated with a CDM group; $\mu$ is a parameter related to subcarrier spacing; and p is the number of DMRS ports, wherein for the first category DMRS port, the $w_t(l')$ includes L elements and corresponds to each OFDM symbol group of one transmission occasion of one channel, or the $w_t(l')$ includes X*L elements which includes X repetitions of one same vector of L elements and the $w_t(l')$ corresponds to the X OFDM symbol groups; for the second category DMRS port, the $w_t(l')$ includes X*L elements which include X different vectors, and each of the X different vectors includes L elements, and the $w_t(l')$ corresponds to the X OFDM symbol groups; or the W, includes X*L elements and corresponds to the X OFDM symbol groups.

In some embodiments, the second category DMRS port includes one of: a third category DMRS port for which X is 2, a fourth category DMRS port for which X is 3; or the third category DMRS port for which X is 2, and the fourth category DMRS port for which X is 3.

In some embodiments, the third category DMRS port and the third category DMRS port share a same DMRS port index.

In some embodiments, a category of a DMRS port with the same DMRS port index is determined by a total number of DMRS OFDM symbol groups of one transmission occasion of one channel. The category may include the third category and the fourth category.

In some embodiments, the first indication or the category of a DMRS port includes at least one of: a number of DMRS OFDM symbol groups of DMRS ports with same DMRS port indices; an indication to indicate whether the number of DMRS OFDM symbol groups of the DMRS ports with the same DMRS port indices is larger than 1; or a length of a TD-OCC of the DMRS ports with the same DMRS port indices.

In some embodiments, a wireless communication node sends to a wireless communication device, first information to determine a first demodulation reference signal (DMRS) table. In some embodiments, the wireless communication node sends a value of a field in a signaling to the wireless communication device. In some embodiments, the value of the field is for use by the wireless communication device to determine a first DMRS parameter according to the first DMRS table and the value of the field. In some embodiments, the first DMRS table includes a mapping between values of the field of the signaling and values of the first DMRS parameter, and each of the values of the field is associated with a respective one of the values of the first DMRS parameter. In some embodiments, the first DMRS table includes the first DMRS parameter, that is of at least two categories of DMRS ports, and different categories of the at least two categories of DMRS ports correspond to at least one of: different numbers of DMRS orthogonal frequency division multiplexing (OFDM) symbol groups of one time domain orthogonal cover code (TD-OCC), different numbers of DMRS OFDM symbols of one TD-OCC, different numbers of DMRS OFDM symbols in one DMRS OFDM symbol group of one TD-OCC, or different relationships between vectors of one TD-OCC. In some embodiments, each of the DMRS OFDM symbol groups includes one or more consecutive OFDM symbols.

In some embodiments, a wireless communication device receives first information from a wireless communication node. In some embodiments, the wireless communication device determines that second category DMRS ports are enabled, wherein a TD-OCC of the second category DMRS ports corresponds to X DMRS OFDM symbol groups. In some embodiments, X is an integer value larger than 1. In some embodiments, each of the DMRS OFDM symbol groups includes one or more consecutive OFDM symbols, and OFDM symbols in different DMRS OFDM symbol groups are consecutive OFDM symbols. In some embodiments, the wireless communication device receives or transmits a channel according to the second category DMRS ports.

In some embodiments, the wireless communication device determines a sequence of at least two categories of DMRS ports according to $a_{k,l}^{(p,~\mu)}=w_f(k')w_t(l')r(2*n+k')$, wherein: $k=4*n+2*k'+\Delta$, or $k=6*n+k'+\Delta$, where k is an index of a subcarrier; $l=\bar{l}+l'$, $l'=0, 1, \ldots, L-1$, where l is an OFDM symbol of a DMRS port p, l' is index of OFDM symbol in one OFDM symbol group, and L is a number of symbols in one OFDM symbol group; k'=0 or 1, is an intermediate parameter to determine an index of a subcarrier k of a DMRS; n comprises non-negative integer values; $w_f(k')$, $w_t(l')$, and $\Delta$ are provided by a defined table which includes a mapping between a number of DMRS ports and the $w_f(k')$, $w_t(l')$, and $\Delta$, where $w_f(k')$ is a FD-OCC $w_t(l')$ is a TD-OCC and $\Delta$ is a RE offset associated with a CDM group; $\mu$ is a parameter related to subcarrier spacing; and p is the number of DMRS ports, wherein for the second category DMRS ports, the $w_t(l')$ includes X*L elements corresponding to the X OFDM symbol groups; or for the second category DMRS ports, the $w_t(l')$ includes X*L elements which include X different vectors, and each of the X different vectors includes L elements corresponds to one of the X OFDM symbol groups.

In some embodiments, the second category DMRS ports include one of: a third category DMRS port for which X is 2; a fourth category DMRS port for which X is 3; or the third category DMRS port for which X is 2, and the fourth category DMRS port for which X is 3.

In some embodiments, the third category DMRS port and the fourth category DMRS port share a same DMRS port index.

In some embodiments, a category of a DMRS port with the same DMRS port index is determined by a total number of DMRS OFDM symbol groups of one transmission occasion of one channel, wherein the category includes the third category and the fourth category.

In some embodiments, for the case of DMRS type I and the number of DMRS OFDM symbol in one DMRS OFDM symbol group being 1, one CDM group includes up to 4 DMRS ports, and there are two CDM groups including up to 8 DMRS ports. In some embodiments, for the case of DMRS type I and the number of DMRS OFDM symbol in one DMRS OFDM symbol group being 2, one CDM group includes up to 8 DMRS ports, and there are two CDM groups including up to 16 DMRS ports. In some embodiments, for the case of DMRS type II and the number of DMRS OFDM symbol in one DMRS OFDM symbol group being 1, one CDM group includes up to 4 DMRS ports, and there are three CDM groups including up to 12 DMRS ports. In some embodiments, for the case of DMRS type II and the number of DMRS OFDM symbol in one DMRS OFDM symbol group being 2, one CDM group includes up to 8

DMRS ports, and there are three CDM groups including up to 24 DMRS ports. In some embodiments, for the case of DMRS type I and the number of DMRS OFDM symbol in one DMRS OFDM symbol group being 1, there are 8 DMRS ports {0-3,8-11}, CDM group 0 includes 4 DMRS ports{0, 1, 8, 9}, and CDM group 1 includes 4 DMRS ports{2,3,10, 11}. In some embodiments, for the case of DMRS type I and the number of DMRS OFDM symbol in one DMRS OFDM symbol group being 2, there are 16 DMRS ports {0-15}, CDM group 0 includes 8 DMRS ports{0,1,8,9,4,5,12,13}, CDM group 1 includes 8 DMRS ports{2,3,10,11,6,7,14,15}. In some embodiments, for the case of DMRS type II and the number of DMRS OFDM symbol in one DMRS OFDM symbol group being 1, there are 12 DMRS ports {0-5,12-17}. CDM group 0 includes 4 DMRS ports{0,1,12,13}, CDM group 1 includes 4 DMRS ports{2,3,14,15}, and CDM group 3 includes 4 DMRS ports {4,5,16,17}. In some embodiments, for the case of DMRS type II and the number of DMRS OFDM symbols in one DMRS OFDM symbol group being 2, there are 24 DMRS ports {0-23}, the CDM group 0 includes 8 DMRS ports{0,1,12,13,6,7,18,19}, the CDM group 1 includes 8 DMRS ports{2,3,14,15,8,9,20,21}, and the CDM group 3 includes 4 DMRS ports{4,5,16,17, 10,11,22,23}.

In some embodiments, for the case of DMRS type I, X for the DMRS ports {0-7} is 1 or 2. In some embodiments, for the case of DMRS type II, X for the DMRS ports {0-11} is 1 or 2. In some embodiments, for the case of DMRS type I, X for the DMRS ports {0-7} is 1 or 2. In some embodiments, for the case of DMRS type II, X for the DMRS ports {0-11} is 1 or 2. In some embodiments, for the case of DMRS type I, X for a DMRS port of the DMRS ports {0-7} is determined by an indication in a signaling. In some embodiments, for the case of DMRS type II, X for a DMRS port of the DMRS ports {0-11} is determined by an indication in a signaling. In some embodiments, for the case of DMRS type I, X for the DMRS ports {0-15} is 1, 2 or 3. In some embodiments, for the case of DMRS type I, X of a DMRS port of the DMRS ports {8-15} is determined by a total number of DMRS OFDM symbol groups of one transmission occasion.

In some embodiments, the second category DMRS ports are included in a DMRS table which includes a mapping between values of the field of the signaling and values of the first DMRS parameter. In some embodiments, the DMRS table includes one or more categories of DMRS ports.

In some embodiments, a non-transitory computer readable medium stores instructions, which when executed by at least one processor, cause the at least one processor to perform any method disclosed herein.

In some embodiments, an apparatus includes at least one processor to implement any method disclosed herein.

In one aspect, a wireless communication node may send, transmit, or provide first information to a wireless communication device. The first information may include a DMRS type between type I and type II, a maximum number of OFDM symbols in one DMRS OFDM symbol group, a second DMRS parameter, a total number of OFDM symbol groups included in one transmission occasion, or a number of DMRS ports. According to the first information, the wireless communication device may determine a first DMRS table. In one aspect, the wireless communication node may send, transmit, or provide a signaling to a wireless communication device. The signaling can be downlink control information (DCI) signaling, radio access control (RRC) signaling, or medium access control control element (MAC-CE) signaling. According to a value of a field in the first information, the wireless communication device may determine a first DMRS parameter according to the first DMRS table and the value of the field.

In some embodiments, the first DMRS table includes a mapping between values of the field of the signaling and values of the first DMRS parameter, and each of the values of the field is associated with a respective one of the values of the first DMRS parameter. The first DMRS table includes the first DMRS parameter, that is of at least two categories of DMRS ports. In some embodiments, different categories of the at least two categories of DMRS ports correspond to at least one of: different numbers of DMRS orthogonal frequency division multiplexing (OFDM) symbol groups of one time domain orthogonal cover code (TD-OCC), different numbers of DMRS OFDM symbols of one TD-OCC, different numbers of DMRS OFDM symbols in one DMRS OFDM symbol group of one TD-OCC, or different relationships between vectors of one TD-OCC. Each of the DMRS OFDM symbol groups may include one or more consecutive OFDM symbols.

In one aspect, indicating DMRS ports based on DMRS table as disclosed herein can support a larger number of DMRS ports. In one aspect, the DMRS table includes DMRS parameters of more than one categories of DMRS ports with TD-OCCs of different number of DMRS OFDM symbol groups. Each DMRS OFDM symbol group may include one or more consecutive DMRS OFDM symbols. DMRS OFDM symbols in different DMRS OFDM symbol groups are nonconsecutive. By allowing a TD-OCC to correspond to more than one DMRS OFDM symbol groups, the supported number of DMRS ports can be increased, because the new DMRS port can be co-scheduled with old UE and does not cause interference for channel transmission of old UE. In addition, one DMRS table may include more than one categories of DMRS ports to increase the flexibility of scheduling. The gNB can dynamically switch between different categories of DMRS ports and schedule old UE and new UE on demand. Index of DMRS port can be shared with different categories of DMRS port, to reduce overhead of signaling while supporting or allowing the flexibility of scheduling. Some parameter may be considered to get DMRS port of co-scheduled UEs. Accordingly, UE may get more estimate of interference from co-scheduled UEs while allowing more DMRS port. By allowing a larger number of DMRS ports, the wireless communication node may communicate with a larger number of wireless communication devices and may allow more layers of MIMO transmission, thereby increasing the spectral efficient of communication.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
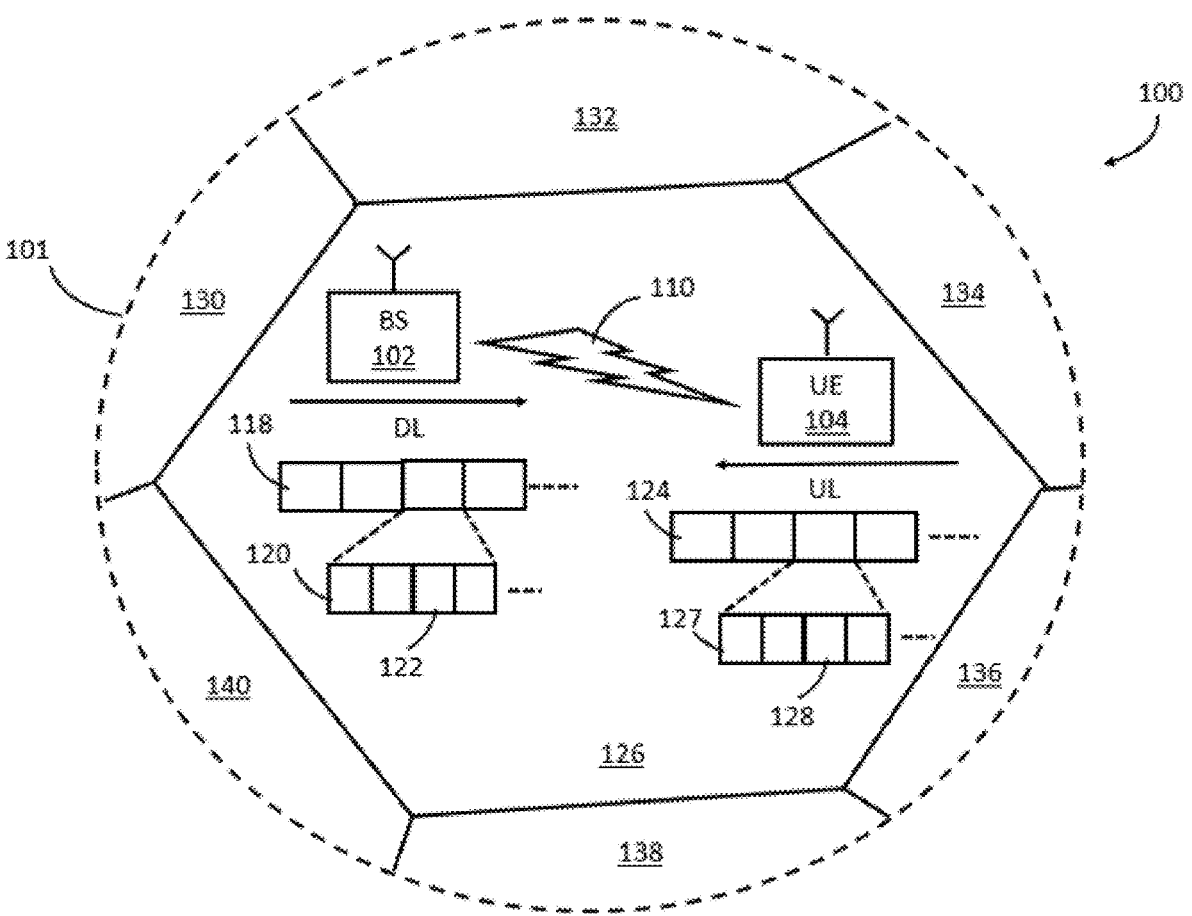
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
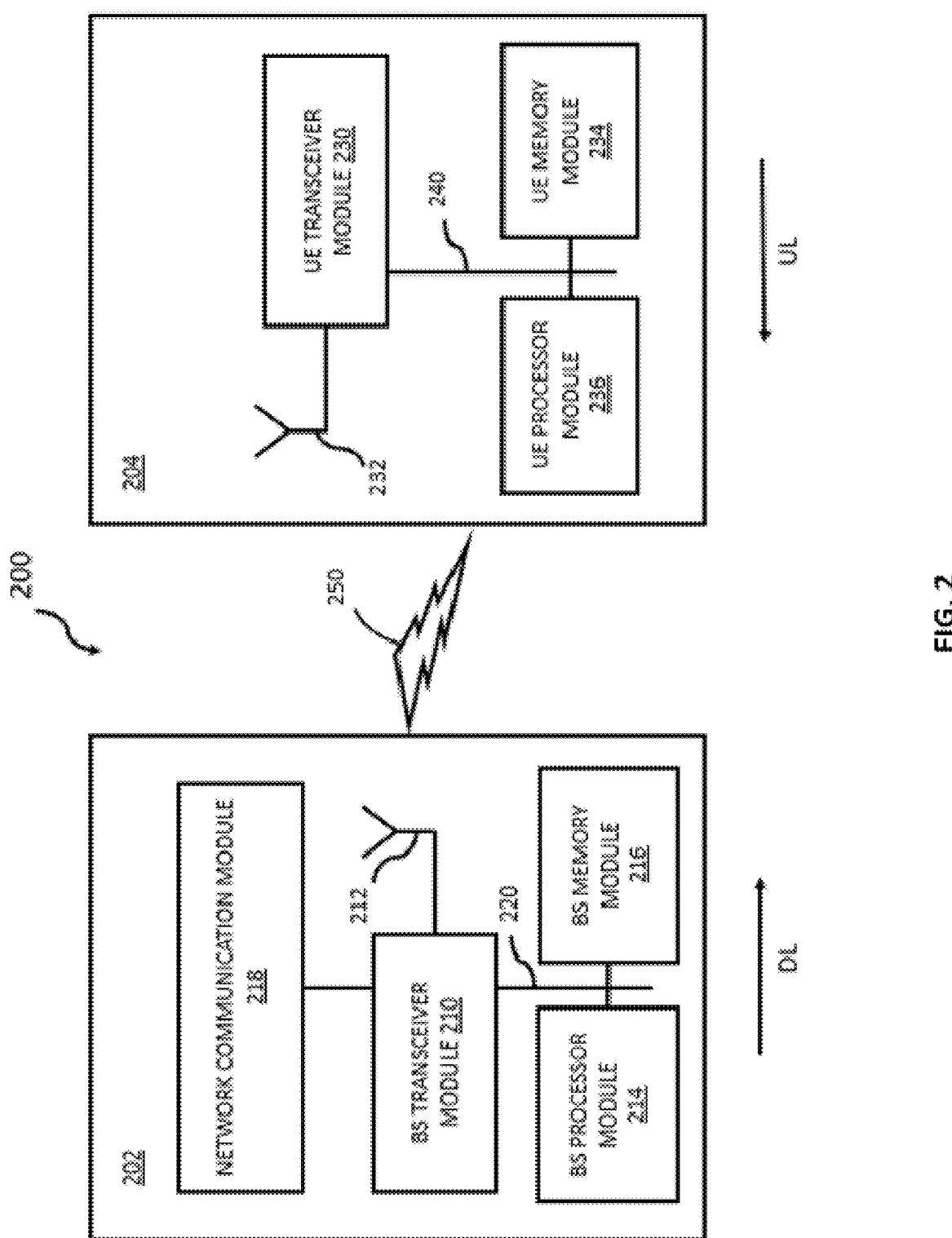
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication link 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 230 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 214 and 236, respectively, such that the processors modules 214 and 236 can read information from, and write information to, memory modules 216 and 234, respectively. The memory modules 216 and 234 may also be integrated into their respective processor modules 214 and 236. In some embodiments, the memory modules 216 and 234 may each include a cache memory for storing temporary variables or other intermediate information during execution of instructions to be executed by processor modules 214 and 236, respectively. Memory modules 216 and 234 may also each include non-volatile memory for storing instructions to be executed by the processor modules 214 and 236, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Indicating and/or Determining DMRS Ports

More orthogonal DMRS ports can allow more layers of MIMO transmission. It is important to increase the spectral efficient of communication. How to increase more orthogonal DMRS ports is the problem which will be solved by the following method. In certain systems (e.g., 5G new radio (NR), Next Generation (NG) systems, 3GPP systems, and/or other systems), a wireless communication device (e.g., UE) and a wireless communication node (e.g., base station) may communicate with each other, according to DMRS parameters. In one aspect, a wireless communication node may send, transmit, or provide first information to a wireless communication device. The first information may include a DMRS type between type I and type II, a maximum number of OFDM symbols in one DMRS OFDM symbol group, a second DMRS parameter, a total number of OFDM symbol groups included in one transmission occasion, or a number of DMRS ports. According to the first information, the wireless communication device may determine a first DMRS table. In one aspect, the wireless communication node may send, transmit, or provide a signaling to a wireless communication device. The signaling can be downlink control information (DCI) signaling, radio access control (RRC) signaling, or medium access control control element (MAC-CE) signaling. According to a value of a field in the first information, the wireless communication device may determine a first DMRS parameter according to the first DMRS table and the value of the field. The wireless communication device may receive channel, or transmit channel according to the determined first DMRS parameter.

In some embodiments, the first DMRS table includes a mapping between values of the field of the signaling and values of the first DMRS parameter, and each of the values of the field is associated with a respective one of the values of the first DMRS parameter. The first DMRS table includes the first DMRS parameter, that is of at least two categories of DMRS ports. In some embodiments, different categories of the at least two categories of DMRS ports correspond to at least one of: different numbers of DMRS orthogonal frequency division multiplexing (OFDM) symbol groups of one time domain orthogonal cover code (TD-OCC), different numbers of DMRS OFDM symbols of one TD-OCC, different numbers of DMRS OFDM symbols in one DMRS OFDM symbol group of one TD-OCC, or different relationships between vectors of one TD-OCC. Each of the DMRS OFDM symbol groups may include one or more consecutive OFDM symbols. The relationships between vectors of one TD-OCC may include that the one TD-OCC includes repeated vectors.

In one aspect, indicating DMRS ports based on DMRS table as disclosed herein can support a larger number of DMRS ports. In one aspect, the DMRS table includes DMRS parameters of more than one categories of DMRS ports with TD-OCCs of different number of DMRS OFDM symbol groups. Each DMRS OFDM symbol group may include one or more consecutive DMRS OFDM symbols. DMRS OFDM symbols in different DMRS OFDM symbol groups are nonconsecutive. By allowing a TD-OCC to correspond to more than one DMRS OFDM symbol groups, the supported number of DMRS ports can be increased, because the new DMRS port can be co-scheduled with old UE and does not cause interference for channel transmission of old UE. In addition, one DMRS table may include more than one categories of DMRS ports to increase the flexibility of scheduling. The gNB can dynamically switch between different categories of DMRS ports and schedule old UE and new UE on demand. Index of DMRS port can be shared with different categories of DMRS port, to reduce overhead of signaling while supporting or allowing the flexibility of scheduling. Some parameter may be considered to get DMRS port of co-scheduled UEs. Accordingly, UE may get more estimate of interference from co-scheduled UEs while allowing more DMRS port. By allowing a larger number of DMRS ports, the wireless communication node may communicate with a larger number of wireless communication devices and may allow more layers of MIMO transmission, thereby increasing the spectral efficient of communication.

Figure 3:
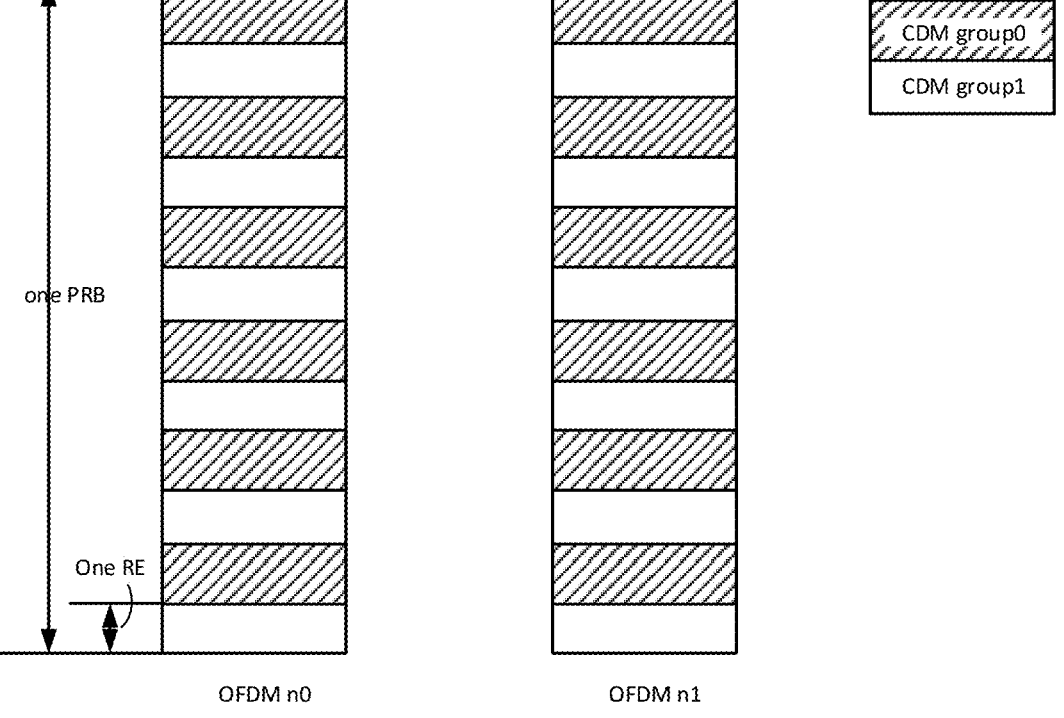
FIG. 3 illustrates two code division multiplexing (CDM) groups for demodulation reference signal (DMRS) type I and one TD-OCC corresponds to two DMRS OFDM groups each of which includes one DMRS OFDM symbol, in accordance with some embodiments of the present disclosure.
Figure 4:
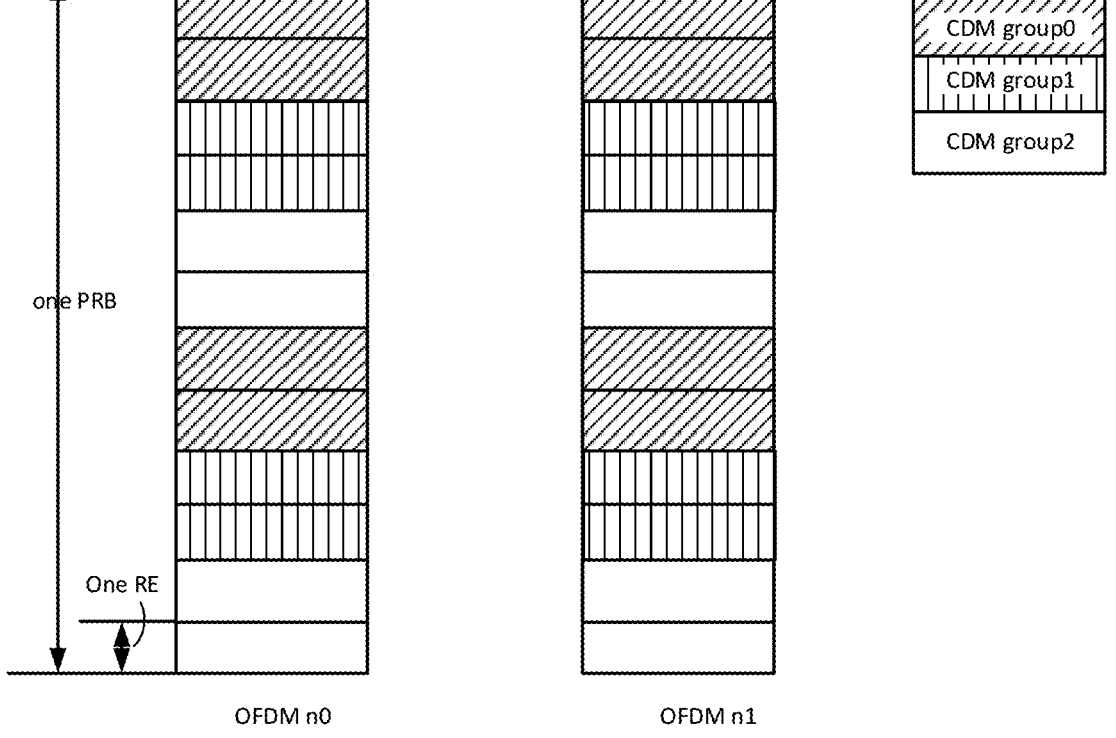
FIG. 4 illustrates three CDM groups for DMRS type II and one TD-OCC corresponds to two DMRS OFDM groups each of which includes one DMRS OFDM symbol, in accordance with some embodiments of the present disclosure.

FIG. 3 illustrates two code division multiplexing (CDM) groups for demodulation reference signal (DMRS) type I and one TD-OCC corresponds to two DMRS OFDM groups each of which includes one DMRS OFDM symbol, in accordance with some embodiments of the present disclosure. FIG. 4 illustrates three CDM groups for DMRS type II and one TD-OCC corresponds to two DMRS OFDM groups each of which includes one DMRS OFDM symbol, in accordance with some embodiments of the present disclosure.

Example 1

For DMRS of physical uplink shared channel (PUSCH), one DMRS table may include multiple categories of DMRS ports. The multiple categories of DMRS ports may correspond different numbers of OFDM (symbol) groups in one TD-OCC. Each OFDM group (or group of OFDM symbols) may include one or more consecutive OFDM symbols. For example, the one OFDM group includes one OFDM symbol or two consecutive OFDM symbols. Different OFDM groups may include non-consecutive OFDM symbols. For example, the gap between two DMRS OFDM symbol groups may be larger than 0.

The DMRS table may include a mapping between a value of a DMRS bit field in DCI, and a first DMRS parameter.

For example, the one DMRS Table includes a first category DMRS port that corresponds to one OFDM group (e.g., the number of OFDM groups=1) in one TD-OCC. If the one OFDM group includes one OFDM symbol, then the first category DMRS port may correspond to TD-OCC of length 1. If one OFDM group includes two consecutive OFDM symbols, then the first category DMRS port may correspond to TD-OCC of length 2. The one DMRS Table may also include a second category DMRS port that corresponds to X OFDM groups, where X is larger than 1. For example, the second category DMRS port may include a third category DMRS port for which X=2. If one DMRS OFDM symbol group includes one OFDM symbol and X=2, then one third category DMRS port may correspond to TD-OCC of length 2. If one OFDM group includes two OFDM symbols and X=2, then one third category DMRS port may correspond to TD-OCC of length 4. For example, the length of TD-OCC may be equal to the number of OFDM symbols in the X OFDM groups. In some implementations, all of DMRS OFDM symbol groups include the same number of OFDM symbols, and the length of TD-OCC may be equal to the number of OFDM symbols in one DMRS symbol group multiplied by X. In some implementations, the number of OFDM symbols in different DMRS symbol groups may be different.

As shown in FIG. 3, each DMRS OFDM symbol group may include one OFDM symbol. For the first category DMRS port, TD-OCC may have a length 1. OFDM symbol n0 and OFDM symbol n1 may each/respectively correspond to one TD-OCC of length 1. In one aspect, there is no TD-OCC for first category DMRS port in this case because TD-OCC of length 1 can be labeled, named, or identified without TD-OCC encoding. For the third category DMRS port and X=2, TD-OCC may have a length 2. One TD-OCC of length 2 may correspond to two DMRS OFDM symbol groups which include OFDM symbol n0 and OFDM symbol n1.

If the UE is indicated with the third category DMRS port, then the number of CDM groups without data may be 2 for DMRS type I, and 3 for DMRS type II. The DMRS type I and DMRS type II may be used to indicate the frequency domain pattern of DMRS ports. In one aspect, FIG. 3 corresponds to DMRS type I, and FIG. 4 corresponds to DMRS type II.

For the first category DMRS port whose TD-OCC length is 1, the UE may obtain the sequence of a DMRS port according to following equation (1)

$$a_{k,l}^{(p,\mu)} = w_f(k')w_t(l')r(2*n+k') \qquad (1)$$

$$k = 4*n + 2*k' + \Delta$$

$$k' = 0, 1;$$

$$l = \bar{l} + l'$$

$$n = 0, 1 \ldots$$

$$l' = 0, 1$$

where $w_f(k')$, $w_t(l')$, and $\Delta$ are given by Table 1. The k is the index of sub-carrier. The reference point for k is sub-carrier 0 in common resource block 0. The l is the OFDM symbol of the DMRS. $\bar{l}$ is the first symbol of each continuous L OFDM symbol. For example, $\bar{l}$ may be the first symbol of each DMRS OFDM symbol group. $\bar{l}$ can be based on higher layer configuration of $l_0$, mapping type and PUSCH duration $l_d$ as shown in Table 2 and Table 3. Table 2 applies when/if a maximum number of OFDM symbols in one DMRS OFDM symbol group equals to 1. Table 3 applies when/if a maximum number of OFDM symbols in one DMRS OFDM symbol group equals to 2. The $l_0$ is the first DM-RS symbol of DMRS and the first symbol of first DMRS OFDM symbol group. r(m) is a bit with index m in a bit sequence generated by a function of Pseudo-random sequence generation. v is the number of layers and the number of DMRS ports. p includes the DMRS ports indicated by DCI and is based on the order indicated in the DCI. μ is a parameter related to subcarrier spacing, for example, the subcarrier spacing of the DMRS is $2^{\mu}*15$ kHz The reference point for l and the position $l_0$ of the first DM-RS symbol may depend on the mapping type. For PUSCH mapping type A, l may be defined or determined relative to the start of the slot if frequency hopping is disabled and relative to the start of each hop in case frequency hopping is enabled, and $l_0$ is given by the higher-layer parameter dmrs-TypeA-Position.

For PUSCH mapping type B, l may be defined relative to the start of the scheduled PUSCH resources if frequency hopping is disabled and relative to the start of each hop in case frequency hopping is enabled, and $l_0=0$.

In one aspect, the position(s) of the DM-RS symbols is given by $\bar{l}$ and duration $l_d$. For example, $l_d$ is the duration between the first OFDM symbol of the slot and the last OFDM symbol of the scheduled PUSCH resources in the slot for PUSCH mapping type A according to Tables 2 and Table 3 if intra-slot frequency hopping is not used. For example, $l_d$ is the duration of scheduled PUSCH resources for PUSCH mapping type B according to 2 and Table 3 if intra-slot frequency hopping is not used. For example, $l_d$ is the duration per hop according to Table 4 if intra-slot frequency hopping is used.

TABLE 1

| parameter for first category DMRS port | | | | | | |
|---|---|---|---|---|---|---|
| CDM | | | $w_f(k')$ | | $w_t(l')$ | |
| p | group λ | Δ | k' = 0 | k' = 1 | l' = 0 | l' = 1 |
| 0 | 0 | 0 | +1 | +1 | +1 | +1 |
| 1 | 0 | 0 | +1 | −1 | +1 | +1 |
| 2 | 1 | 1 | +1 | +1 | +1 | +1 |
| 3 | 1 | 1 | +1 | −1 | +1 | +1 |
| 4 | 0 | 0 | +1 | +1 | +1 | −1 |
| 5 | 0 | 0 | +1 | −1 | +1 | −1 |
| 6 | 1 | 1 | +1 | +1 | +1 | −1 |
| 7 | 1 | 1 | +1 | −1 | +1 | −1 |

TABLE 2

| | DM-RS positions $\bar{l}$ | | | | | | | |
|---|---|---|---|---|---|---|---|---|
| | PUSCH mapping type A dmrs-AdditionalPosition | | | | PUSCH mapping type B dmrs-AdditionalPosition | | | |
| $l_d$ in symbols | pos0 | pos1 | pos2 | pos3 | pos0 | pos1 | pos2 | pos3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 4 | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

TABLE 3

| | | | | DM-RS positions $\bar{l}$ | | | | |
|---|---|---|---|---|---|---|---|---|
| $l_d$ in | PUSCH mapping type A dmrs-AdditionalPosition | | | | PUSCH mapping type B dmrs-AdditionalPosition | | | |
| symbols | pos0 | pos1 | pos2 | pos3 | pos0 | pos1 | pos2 | pos3 |
| <4 | — | — | | | — | — | | |
| 4 | $l_0$ | $l_0$ | | | — | — | | |
| 5 | $l_0$ | $l_0$ | | | $l_0$ | $l_0$ | | |
| 6 | $l_0$ | $l_0$ | | | $l_0$ | $l_0$ | | |
| 7 | $l_0$ | $l_0$ | | | $l_0$ | $l_0$ | | |
| 8 | $l_0$ | $l_0$ | | | $l_0$ | $l_0, 5$ | | |
| 9 | $l_0$ | $l_0$ | | | $l_0$ | $l_0, 5$ | | |
| 10 | $l_0$ | $l_0, 8$ | | | $l_0$ | $l_0, 7$ | | |
| 11 | $l_0$ | $l_0, 8$ | | | $l_0$ | $l_0, 7$ | | |
| 12 | $l_0$ | $l_0, 8$ | | | $l_0$ | $l_0, 9$ | | |
| 13 | $l_0$ | $l_0, 10$ | | | $l_0$ | $l_0, 9$ | | |
| 14 | $l_0$ | $l_0, 10$ | | | $l_0,$ | $l_0, 9$ | | |

TABLE 4

| | | | | | DM-RS positions $\bar{l}$ | | | | | | | |
|---|---|---|---|---|---|---|---|---|---|---|---|---|
| | PUSCH mapping type A | | | | | | | | PUSCH mapping type B | | | |
| | $l_0 = 2$ dmrs-AdditionalPosition | | | | $l_0 = 3$ dmrs-AdditionalPosition | | | | $l_0 = 0$ dmrs-AdditionalPosition | | | |
| | pos0 | | pos1 | | pos0 | | pos1 | | pos0 | | pos1 | |
| $l_d$ in symbols | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop |
| ≤3 | — | — | — | — | — | — | — | — | 0 | 0 | 0 | 0 |
| 4 | 2 | 0 | 2 | 0 | 3 | 0 | 3 | 0 | 0 | 0 | 0 | 0 |
| 5, 6 | 2 | 0 | 2 | 0, 4 | 3 | 0 | 3 | 0, 4 | 0 | 0 | 0, 4 | 0, 4 |
| 7 | 2 | 0 | 2, 6 | 0, 4 | 3 | 0 | 3 | 0, 4 | 0 | 0 | 0, 4 | 0, 4 |

The time domain OFDM position l may be based on one of Table 2, Table 3 or Table 4. Table 2 may be suitable for a case where the number of OFDM symbols in one DMRS OFDM symbol group equals to 1 and intra-slot frequency hopping is disabled. Table 3 may be suitable for a case where the number of OFDM symbols in one DMRS OFDM symbol group equals to 2 and intra-slot frequency hopping is disabled. Table 4 may be suitable for a case where the number of OFDM symbols in one DMRS OFDM symbol group equals to 1 and intra-slot frequency hopping is enabled.

For the third category DMRS port, the UE may assume the sequence of a DMRS port according to following equation (2)

$$a_{k,l}^{(p,\mu)} = w_f(k')w_t(l'')r(2*n + k') \qquad (2)$$

$$k = 4*n + 2*k' + \Delta$$

$$k' = 0, 1;$$

$$l = \bar{l} + l'$$

$$n = 0, 1 \ldots$$

$$l' = 0, 1$$

$$l'' = l'_{\bar{l}_{first}}, l'_{\bar{l}_{second}}$$

where $w_f(k')$, $w_t(l')$, and $\Delta$ are given by Tables 5. l is based on Table 2. The $\bar{l}_{first}$ and $\bar{l}_{second}$ corresponds to the first $\bar{l}$ and the second $\bar{l}$ of one TD-OCC of length Z which equals to X*number of OFDM symbols in one DMRS OFDM symbol group. For example, if the $\bar{l}$ is determined to be as $\{l_0 7\}$ according to Table 2, then the first corresponds to $l_0$ such as no in FIGS. 3 and 4. The second corresponds to 7 such as n1 in FIGS. 3 and 4. $l'_{7_{first}}$ first corresponds to $\bar{l}$ of first DMRS OFDM symbol group of one TD-OCC. $l'_{7_{second}}$ second corresponds to first symbol of second DMRS OFDM symbol group of one TD-OCC. $\bar{l}_{first}$ corresponds to first DMRS OFDM symbol group of one TD-OCC. $\bar{l}_{second}$ corresponds to second DMRS OFDM symbol group of one TD-OCC. If the $\bar{l}$ is determined as $\{_0, 16, 5, 8, 11\}$ according to Table 2. The four DMRS OFDM group corresponds to two TD-OCC of length 2. The OFDM symbol $\{l_0, 5\}$ corresponds to one TD-OCC and the OFDM symbol $\{8, 11\}$ corresponds to another TD-OCC. For TD-OCC of OFDM symbol $\{l_0, 5\}$, $\bar{l}_{first}$ and $\bar{l}_{second}$ refers to $l_0$ and 5 respectively. For TD-OCC of OFDM symbol $\{8,11\}$, first and second refers to 8 and 11 respectively. In equation (2), the $l'_{\bar{l}_{first}}$ is the l'=0,1 of the $\bar{l}_{first}$ DMRS OFDM symbol group of one TD-OCC. The $l'_{7_{second}}$ is the $\bar{l}$=0,1 of the $\bar{l}_{second}$ DMRS OFDM symbol group of one TD-OCC.

TABLE 5

| CDM group | | | $w_f(k')$ | | $w_t(l')$ | | | |
|---|---|---|---|---|---|---|---|---|
| | | | | | $\bar{l}_{first}$ | | $\bar{l}_{second}$ | |
| p | λ | Δ | k' = 0 | k' = 1 | l' = 0 | l' = 1 | l' = 0 | l' = 1 |
| 8 | 0 | 0 | +1 | +1 | +1 | +1 | −1 | −1 |
| 9 | 0 | 0 | +1 | −1 | +1 | +1 | −1 | −1 |
| 10 | 1 | 1 | +1 | +1 | +1 | +1 | −1 | −1 |
| 11 | 1 | 1 | +1 | −1 | +1 | +1 | −1 | −1 |
| 12 | 0 | 0 | +1 | +1 | +1 | −1 | −1 | +1 |
| 13 | 0 | 0 | +1 | −1 | +1 | −1 | −1 | +1 |
| 14 | 1 | 1 | +1 | +1 | +1 | −1 | −1 | +1 |
| 15 | 1 | 1 | +1 | −1 | +1 | −1 | −1 | +1 |

The first category DMRS port and third category DMRS port can be combined to one Table 6. They both follow Table 6 and equation (1) or equation (2).

First category DMRS port 0~7 corresponds to same $w_t(l')$ across $\bar{l}_{first}$ and $\bar{l}_{second}$, third category DMRS port 8~15 corresponds to different $w_t(l')$ across $\bar{l}_{first}$ and $\bar{l}_{second}$.

TABLE 6

| CDM group | | | $w_f(k')$ | | $w_t(l')$ — $I_{first}$ | | $w_t(l')$ — $I_{second}$ | |
|---|---|---|---|---|---|---|---|---|
| p | λ | Δ | k' = 0 | k' = 1 | l' = 0 | l' = 1 | l' = 0 | l' = 1 |
| 0 | 0 | 0 | +1 | +1 | +1 | +1 | +1 | +1 |
| 1 | 0 | 0 | +1 | −1 | +1 | +1 | +1 | +1 |
| 2 | 1 | 1 | +1 | +1 | +1 | +1 | +1 | +1 |
| 3 | 1 | 1 | +1 | −1 | +1 | +1 | +1 | +1 |
| 4 | 0 | 0 | +1 | +1 | +1 | −1 | +1 | −1 |
| 5 | 0 | 0 | +1 | −1 | +1 | −1 | +1 | −1 |
| 6 | 1 | 1 | +1 | +1 | +1 | −1 | +1 | −1 |
| 7 | 1 | 1 | +1 | −1 | +1 | −1 | +1 | −1 |
| 8 | 0 | 0 | +1 | +1 | +1 | +1 | −1 | −1 |
| 9 | 0 | 0 | +1 | −1 | +1 | +1 | −1 | −1 |
| 10 | 1 | 1 | +1 | +1 | +1 | +1 | −1 | −1 |
| 11 | 1 | 1 | +1 | −1 | +1 | +1 | −1 | −1 |
| 12 | 0 | 0 | +1 | +1 | +1 | −1 | −1 | +1 |
| 13 | 0 | 0 | +1 | −1 | +1 | −1 | −1 | +1 |
| 14 | 1 | 1 | +1 | +1 | +1 | −1 | −1 | +1 |
| 15 | 1 | 1 | +1 | −1 | +1 | −1 | −1 | +1 |

In one aspect, in Table 6, $w_t(1')$ is same across the first DMRS OFDM symbol group and the second DMRS OFDM symbol group of one TD-OCC for DMRS port 0~7. The length of TD-OCC of DMRS port 0~7 can be 2 or 4. Which length of TD-OCC to use for the DMRS port 0-7 may be up to gNB and may depend on the total layers allocated to one UE or multiple co-scheduled UEs when the gNB get the channel estimation based on DMRS port 0~7. If the gNB allocates at least one of DMRS port from 0-7 and at least one of DMRS port from 8-15 in same CDM group for one UEs or multiple UEs on same PRB (physical resource block), then the gNB may use TD-OCC length 4 to get channel based on the at least one of DMRS port from 0-7. If the gNB allocates at least one of DMRS port only from 0-7 and no DMRS port from 8-15 in same CDM group for one UEs or multiple UEs on same PRB (physical resource block), then the gNB may use TD-OCC length 2 to get channel based on the at least one of DMRS port from 0-7.

In some embodiments, each CDM group may include 2 orthogonal DMRS ports multiplexed by 2 FDM-OCC $w_f(k')$ There can be 2 CDM groups. One $w_t(1')$ may have 4 orthogonal DMRS ports. Although 16 orthogonal DMRS ports for third category of DMRS ports can be provided for four $w_t(1')$ orthogonal TD-OCC, DMRS port 8 to 15 can be determined, utilized or assigned to be the third category of DMRS ports. The DMRS number of 0-7 can be shared between the first category DMRS port and the third category DMRS port. The TD-OCC length for DMRS port 0-7 can be viewed as 4 or viewed as 2. Which TD-OCC length is used by the gNB to get the channel based on DMRS ports 0-7 may be determined by gNB. For example, if the UE 1 is allocated with DMRS port {0,1} and there are less than 7 co-scheduled UE of the UE1, then the gNB may obtain or be assigned to the channel from UE1 of DMRS port {0,1} according to TD-OCC of length 2. If the UE 1 is allocated with DMRS port {0,1} and there are more than 7 co-scheduled UE of the UE1, then the gNB may obtain or be assigned to the channel from UE1 of DMRS port {0,1} according to TD-OCC of length 4. For example, if the UE 1 is allocated with DMRS port {0,1} and there are less than 4 co-scheduled UEs in the same CDM group, then the gNB may obtain or be assigned to the channel from UE1 of DMRS port {0,1} according to TD-OCC of length 2. If the UE 1 is allocated with DMRS port {0,1} and there are more than 4 in the same CDM group, then the gNB may obtain or be assigned to the channel from UE1 of DMRS port {0, 1} according to TD-OCC of length 4.

For DMRS type II, the UE may obtain the sequence of a DMRS port according to following equation (3)

$$a_{k,l}^{(p,\mu)} = w_f(k')w_t(l')r(2*n+k') \qquad (3)$$

$$k = 6*n+k'+\Delta$$

$$k' = 0,1;$$

$$l = \bar{l}+l'$$

$$n = 0, 1 \dots$$

$$j = 0, 1, \dots, v-1$$

$$l' = 0, 1$$

where $w_f(k')$, $w_t(l')$, and $\Delta$ are given by Tables 7. is based on one of Table 2, Table 3 or Table 4. The first category DMRS port may include DMRS port 0~11 and the third category DMRS port may include DMRS port 12~23. First category DMRS port 0~7 may correspond to same $w_t(l')$ across $I_{first}$ and $I_{second}$. Third category DMRS port 8~15 may correspond to different $w_t(l')$ across $I_{first}$ and $I_{second}$. Each CDM group may include 2 orthogonal DMRS ports multiplexed by 2 FDM-OCC $w_f(k')$. For 3 CDM groups, one may have 6 orthogonal DMRS ports. Although 24 orthogonal DMRS ports for third category of DMRS ports can be provided for 4 orthogonal TD-OCC $w_t(l')$, DMRS port 12 to 23 can be determined, utilized or assigned to be the third category of DMRS ports. The DMRS number of 0-11 can be shared between the first category DMRS port and the third category DMRS port. The TD-OCC length for DMRS port 0-11 can be viewed as 4 or viewed as 2. Which TD-OCC length is used by the gNB to get the channel based on DMRS ports 0-11 may be determined by gNB and may depend on the total layers allocated for UEs. For example, if the UE 1 is allocated with DMRS port {0,1} and there are less than 12 co-scheduled UE of the UE1, then the gNB may obtain or be assigned to the channel from UE1 of DMRS port {0,1} according to TD-OCC of length 2. If the UE 1 is allocated with DMRS port {0,1} and there are more than 12 co-scheduled UE of the UE1, then the gNB may obtain or be assigned to the channel from UE1 of DMRS port {0,1} according to TD-OCC of length 4. For example, if the UE 1 is allocated with DMRS port {0,1} and there are less than 4 co-scheduled UEs in the same CDM group, then the gNB may obtain or be assigned to the channel from UE1 of DMRS port {0,1} according to TD-OCC of length 2. If the UE 1 is allocated with DMRS port {0,1} and there are more than 4 in the same CDM group, then the gNB may obtain or be assigned to the channel from UE1 of DMRS port {0,1} according to TD-OCC of length 4.

TABLE 7

| CDM group | | | $w_f(k')$ | | $w_t(l')$ — $I_{first}$ | | $w_t(l')$ — $I_{second}$ | |
|---|---|---|---|---|---|---|---|---|
| p | λ | Δ | k' = 0 | k' = 1 | l' = 0 | l' = 1 | l' = 0 | l' = 1 |
| 0 | 0 | 0 | +1 | +1 | +1 | +1 | +1 | +1 |
| 1 | 0 | 0 | +1 | −1 | +1 | +1 | +1 | +1 |
| 2 | 1 | 2 | +1 | +1 | +1 | +1 | +1 | +1 |
| 3 | 1 | 2 | +1 | −1 | +1 | +1 | +1 | +1 |
| 4 | 2 | 4 | +1 | +1 | +1 | +1 | +1 | +1 |

TABLE 7-continued

| CDM group | | | $w_f(k')$ | | $w_t(l')$ $I_{first}$ | | $I_{second}$ | |
|---|---|---|---|---|---|---|---|---|
| p | λ | Δ | k' = 0 | k' = 1 | l' = 0 | l' = 1 | l' = 0 | l' = 1 |
| 5 | 2 | 4 | +1 | −1 | +1 | +1 | +1 | +1 |
| 6 | 0 | 0 | +1 | +1 | +1 | −1 | +1 | −1 |
| 7 | 0 | 0 | +1 | −1 | +1 | −1 | +1 | −1 |
| 8 | 1 | 2 | +1 | +1 | +1 | −1 | +1 | −1 |
| 9 | 1 | 2 | +1 | −1 | +1 | −1 | +1 | −1 |
| 10 | 2 | 4 | +1 | +1 | +1 | −1 | +1 | −1 |
| 11 | 2 | 4 | +1 | −1 | +1 | −1 | +1 | −1 |
| 12 | 0 | 0 | +1 | +1 | +1 | +1 | −1 | −1 |
| 13 | 0 | 0 | +1 | −1 | +1 | +1 | −1 | −1 |
| 14 | 1 | 2 | +1 | +1 | +1 | +1 | −1 | −1 |
| 15 | 1 | 2 | +1 | −1 | +1 | +1 | −1 | −1 |
| 16 | 2 | 4 | +1 | +1 | +1 | +1 | −1 | −1 |
| 17 | 2 | 4 | +1 | −1 | +1 | +1 | −1 | −1 |
| 18 | 0 | 0 | +1 | +1 | +1 | −1 | −1 | +1 |
| 19 | 0 | 0 | +1 | −1 | +1 | −1 | −1 | +1 |
| 20 | 1 | 2 | +1 | +1 | +1 | −1 | −1 | +1 |
| 21 | 1 | 2 | +1 | −1 | +1 | −1 | −1 | +1 |
| 22 | 2 | 4 | +1 | +1 | +1 | −1 | −1 | +1 |
| 23 | 2 | 4 | +1 | −1 | +1 | −1 | −1 | +1 |

In one aspect, the l' can be obtained from Table 8. The value of l' may include 0 when the number of OFDM symbol in one DMRS OFDM symbol group equals to 1. The value of l' may be 0 or 1 when the number of OFDM symbol in one DMRS OFDM symbol group equals to 2. The Table 8 also provides the mapping between the DMRS number and parameter.

The $w_t(l')$ for l'=1 in Table 5 to 7 may be ignored in the case where the number of DMRS OFDM symbols in one DMRS OFDM symbol group is equal to a value of 1. The maximum number of continuous OFDM symbols in one DMRS OFDM symbol group may be configured by a parameter max-length. If max-length is configured to be 2, then the actual number of continuous OFDM symbols in one DMRS OFDM symbol may be one value from { 1,2} indicated by DCI. As shown in Table 8, for type I and single symbol DMRS in one DMRS OFDM symbol group, DMRS ports of {0,1,2,3,8,9,10,11} are supported, because the $w_t(l')$ has one element corresponding to l'=0.

TABLE 8

| The number of OFDM symbol in one DMRS OFDM symbol group | l' | Supported antenna ports p̃ Configuration DMRS type I | Configuration DMRS type II |
|---|---|---|---|
| single-symbol DM-RS | 0 | 0-3, 8, 9, 10, 11 | 0-5, 12-17 |
| double-symbol DM-RS | 0, 1 | 0-15 | 0-23 |

For PUSCH transmission, if the UE is configured by RRC signaling/MAC-CE signaling with DMRS type I and the maximum number of OFDM symbol in one DMRS OFDM symbol group is 1 and the UE is indicated with Y (number of) layers in DCI, wherein Y is a value belonging to the set of {1,2,3,4} or belonging to the set of {1,2,3,4,5,6,7,8}, then the UE may be indicated with Y DMRS ports from DMRS ports {0-3,8,9,10,11} by DCI.

For PUSCH transmission, if the UE is configured by RRC signaling/MAC-CE signaling with DMRS type II and the maximum number of OFDM symbol in one DMRS OFDM symbol group is 1 and the UE is indicated with Y layers in DCI, wherein Y is a value belonging to the set of {1,2,3,4} or is a value belonging to the set of {1,2,3,4,5,6,7,8}, then the UE may be indicated with Y DMRS ports from DMRS ports {0-5,12-17} by DCI.

Specifically, for PUSCH transmission, if the UE is configured by RRC signaling/MAC-CE signaling and the maximum number of OFDM symbols in one DMRS OFDM symbol group is 1 and for DMRS type I or type II, there may be a DMRS Table which includes mapping between a value of a DMRS bit field of the DCI and the first DMRS parameter. The first DMRS parameter may include the number of CDM groups without data and Y DMRS ports from DMRS ports {0-3,8,9,10,11} for type I or from {0-5, 12-17} for type II. The UE may get the power offset between DMRS and PUSCH according to the number of CDM group without data. The UE may also get the REs where the PUSCH may not be mapped according to the number of CDM group without data. The UE may determine the Y DMRS ports and the number of CDM group without data according to the DMRS mapping and the value of the DMRS bit field indicated in the DCI. Each Y may correspond to one DMRS mapping Table. The Y may be determined by other field in the DCI, such as the TPMI bit field or SRI (SRS resource indication) field. If Y is indicated to be 1 in the DCI, the DMRS Table may be as shown in Table 9 or Table 10. In the Table 9, when the UE is indicated with third category DMRS port, the number of CDM groups without data may be 2. But in Table 10, when the UE is indicated with third category DMRS port in CDM group 1, the number of CDM groups without data may be 2. When the UE is indicated with third category DMRS port in CDM group 0, the number of CDM group without data can be one from/of 1 or 2, where 1 and 2 may correspond to different value of the Table. The actual number from {1,2} may be indicated by the DCI as shown in value 6-9 in Table 10. If the Y is larger than 1, the Y DMRS ports may include one category of DMRS port for one value of one DMRS mapping Table. Alternatively, if the Y is larger than 1, the Y DMRS ports may include two categories of DMRS port for one value of one DMRS mapping Table. The two categories of DMRS ports of the one value can be in one CDM group or can be in different CDM groups.

TABLE 9

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6 | 2 | 8 |
| 7 | 2 | 9 |
| 8 | 2 | 10 |
| 9 | 2 | 11 |
| 10-15 | Reserved | Reserved |

TABLE 10

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |

TABLE 10-continued

| Value | Number of DMRS CDM group(s) without data | DMRS port(s) |
|---|---|---|
| 4 | 2 | 2 |
| 5 | 2 | 3 |
| 6 | 2 | 8 |
| 7 | 2 | 9 |
| 8 | 1 | 8 |
| 9 | 1 | 9 |
| 10 | 2 | 10 |
| 11 | 2 | 11 |
| 12-15 | Reserved | Reserved |

For PUSCH transmission, if the UE is configured by RRC signaling/MAC-CE signaling with DMRS type I and the maximum number of symbols in one DMRS OFDM symbol group is 2 and the UE is indicated with Y layers in DCI, wherein Y belongs to {1,2,3,4} or belongs to {1,2,3,4,5,6, 7,8}, then the UE may be indicated with Y DMRS ports from DMRS ports{0-15} by DCI.

For PUSCH transmission, if the UE is configured by RRC signaling/MAC-CE signaling with DMRS type II and the maximum number of symbols in one DMRS OFDM symbol group is 2 and the UE is indicated with Y layers in DCI, wherein Y belongs to {1,2,3,4} or belongs to {1,2,3,4,5,6, 7,8}, then the UE may be indicated with Y DMRS port from DMRS ports{0-23} by DCI.

Specifically, for PUSCH transmission, if the UE is configured by RRC signaling/MAC-CE signaling the maximum number of symbols in one DMRS OFDM symbol group is 2 and for DMRS type I or type II, a DMRS Table may include mapping between the value of a DMRS bit field of the DCI and the first DMRS parameter. The first DMRS parameter may include the number of CDM groups without data, Y DMRS ports from DMRS ports{0-15} for type I or from DMRS ports{0-23} for type II and the number of consecutive OFDM symbols in one DMRS OFDM symbol group. Each Y may correspond to one DMRS mapping Table. In a first implementation, if the Y DMRS ports include third category DMRS port, the number of CDM groups without data may be 2 and the number of consecutive OFDM symbol in one DMRS OFDM symbol group may be 2. In a second implementation, if the Y DMRS ports include third category DMRS port in CDM group 0 and doesn't include DMRS port in CDM group 1, such as includes one or more DMRS port from {8,9, 12,13}, the number of CDM group without data can be one from {1,2} and the number of consecutive OFDM symbol in one DMRS OFDM symbol group may be 2. The different numbers of CDM groups without data can correspond to different values of the DMRS Table for the Y DMRS ports. In a third implementation, if the Y DMRS ports include third category DMRS port in CDM group 0 and corresponds to same $w_t(l')$ across l'=0 and l'=1 and doesn't include DMRS port in CDM group 1, the number of CDM groups without data can be one from {1,2} and the number of consecutive OFDM symbol in one DMRS OFDM symbol group can be one from {1,2}. One value of the DMRS bit field corresponds to one number of CDM group without data and one number of consecutive OFDM symbols in one DMRS OFDM symbol group. Then for one same Y DMRS port combination which includes second DMRS port in CDM group 0 and corresponds to same $w_t(l')$ across l'=0 and l'=1 and doesn't include DMRS port in CDM group 1, there are four values in the DMRS Table each of which corresponds to one combination of the number of CDM group without data from {1,2} and the number of consecutive OFDM symbol in one DMRS OFDM symbol group from {1,2}. For example, for type I, if the Y DMRS ports which include one or two DMRS ports from {8,9} such as {8,9}, there are following four entries in the DMRS Table as shown in Table 11. For one same Y DMRS port combination which includes second DMRS port in CDM group 0 and corresponds to different $w_t(l')$ across l'=0 and l'=1 and doesn't include DMRS port in CDM group 1, there are two values in the DMRS Table each of which corresponds to one combination of the number of CDM group without data from {1,2} and the number of consecutive OFDM symbol in one DMRS OFDM symbol group may be 2.

TABLE 11

| value | The number of CDM groups without data | DMRS port(s) | The number of OFDM symbols in one DMRS OFDM symbol group |
|---|---|---|---|
| j1 | 1 | 8, 9 | 1 |
| j2 | 1 | 8, 9 | 2 |
| j3 | 2 | 8, 9 | 1 |
| j4 | 2 | 8, 9 | 2 |

The number of CDM group without data 1,2 and 3 as shown in Table 9-11 may refer to CDM group {0}, {0,1} and {0,1,2} respectively as shown in Table 1, 5 to 7.

In some implementation, the second category DMRS port includes a fourth category DMRS port for which X=3. One DMRS Table includes the first category DMRS port whose TD-OCC includes one DMRS OFDM symbol group and a fourth category DMRS port whose TD-OCC includes 3 DMRS OFDM symbol groups. For example, the X is 3. The UE may assume the sequence of a DMRS port according to equation (1) or (4) for the fourth category DMRS port for DMRS type I.

$$a_{k,l}^{(p,\mu)} = w_f(k')w_t(l'')r(2*n+k') \tag{4}$$

$$k = 4*n+2*k'+\Delta$$

$$k' = 0, 1;$$

$$l = \bar{l} + l'$$

$$n = 0, 1 \ldots$$

$$l' = 0, 1$$

$$l' = l'_{\bar{l}_{first}}, l'_{\bar{l}_{second}}, l'_{\bar{l}_{third}}$$

where $w_f(k')$, $w_t(l')$, and $\Delta$ are given by Tables 12 or Table 13.

TABLE 12

| CDM group | | | $W_f(k')$ | | $W_t(l')$ | | |
|---|---|---|---|---|---|---|---|
| | | | | | $\bar{l}_{first}$ | $\bar{l}_{second}$ | $\bar{l}_{third}$ |
| p | λ | Δ | k' = 0 | k' = 1 | l' = 0 | l' = 0 | l' = 0 |
| 8 | 0 | 0 | +1 | +1 | +1 | $e^{j2\pi\frac{2}{3}}$ | $e^{j2\pi\frac{1}{3}}$ |
| 9 | 0 | 0 | +1 | −1 | +1 | $e^{j2\pi\frac{2}{3}}$ | $e^{j2\pi\frac{1}{3}}$ |
| 10 | 1 | 1 | +1 | +1 | +1 | $e^{j2\pi\frac{2}{3}}$ | $e^{j2\pi\frac{1}{3}}$ |
| 11 | 1 | 1 | +1 | −1 | +1 | $e^{j2\pi\frac{2}{3}}$ | $e^{j2\pi\frac{1}{3}}$ |

TABLE 13

| CDM group p | λ | Δ | $W_f(k')$ k' = 0 | k' = 1 | $W_t(l')$ $l'_{first}$ l' = 0 | $l'_{second}$ l' = 0 | $l'_{third}$ l' = 0 |
|---|---|---|---|---|---|---|---|
| 8 | 0 | 0 | +1 | +1 | +1 | $e^{j2\pi\frac{1}{3}}$ | $e^{j2\pi\frac{2}{3}}$ |
| 9 | 0 | 0 | +1 | −1 | +1 | $e^{j2\pi\frac{1}{3}}$ | $e^{j2\pi\frac{2}{3}}$ |
| 10 | 1 | 1 | +1 | +1 | +1 | $e^{j2\pi\frac{1}{3}}$ | $e^{j2\pi\frac{2}{3}}$ |
| 11 | 1 | 1 | +1 | −1 | +1 | $e^{j2\pi\frac{1}{3}}$ | $e^{j2\pi\frac{2}{3}}$ |

Specifically, the UE may assume the sequence of a DMRS port according to equation (3) or (5) for the fourth category DMRS port for DMRS type II.

$$a_{k,l}^{(p,\mu)} = w_f(k')w_t(l')r(2*n+k') \quad (5)$$

$$k = 6*n + k' + \Delta$$

$$k' = 0,1;$$

$$l = \bar{l} + l'$$

$$n = 0, 1 \dots$$

$$j = 0, 1, \dots, v-1$$

$$l' = 0, 1$$

$$l'' = l'_{l_{first}}, l'_{l_{second}}, l'_{l_{third}}$$

where $w_f(k')$, $w_t(l')$, and $\Delta$ are given by Tables 14 or Table 15.

TABLE 14

| CDM group p | λ | Δ | $W_f(k')$ k' = 0 | k' = 1 | $W_t(l')$ $l'_{first}$ l' = 0 | $l'_{second}$ l' = 0 | $l'_{third}$ l' = 0 |
|---|---|---|---|---|---|---|---|
| 12 | 0 | 0 | +1 | +1 | +1 | $e^{j2\pi\frac{2}{3}}$ | $e^{j2\pi\frac{1}{3}}$ |
| 13 | 0 | 0 | +1 | −1 | +1 | $e^{j2\pi\frac{2}{3}}$ | $e^{j2\pi\frac{1}{3}}$ |
| 14 | 1 | 2 | +1 | +1 | +1 | $e^{j2\pi\frac{2}{3}}$ | $e^{j2\pi\frac{1}{3}}$ |
| 15 | 1 | 2 | +1 | −1 | +1 | $e^{j2\pi\frac{2}{3}}$ | $e^{j2\pi\frac{1}{3}}$ |
| 16 | 2 | 4 | +1 | +1 | +1 | $e^{j2\pi\frac{2}{3}}$ | $e^{j2\pi\frac{1}{3}}$ |
| 17 | 2 | 4 | +1 | −1 | +1 | $e^{j2\pi\frac{2}{3}}$ | $e^{j2\pi\frac{1}{3}}$ |

TABLE 15

| CDM group p | λ | Δ | $W_f(k')$ k' = 0 | k' = 1 | $W_t(l')$ $l'_{first}$ l' = 0 | $l'_{second}$ l' = 0 | $l'_{third}$ l' = 0 |
|---|---|---|---|---|---|---|---|
| 12 | 0 | 0 | +1 | +1 | +1 | $e^{j2\pi\frac{1}{3}}$ | $e^{j2\pi\frac{2}{3}}$ |
| 13 | 0 | 0 | +1 | −1 | +1 | $e^{j2\pi\frac{1}{3}}$ | $e^{j2\pi\frac{2}{3}}$ |
| 14 | 1 | 2 | +1 | +1 | +1 | $e^{j2\pi\frac{1}{3}}$ | $e^{j2\pi\frac{2}{3}}$ |
| 15 | 1 | 2 | +1 | −1 | +1 | $e^{j2\pi\frac{1}{3}}$ | $e^{j2\pi\frac{2}{3}}$ |
| 16 | 2 | 4 | +1 | +1 | +1 | $e^{j2\pi\frac{1}{3}}$ | $e^{j2\pi\frac{2}{3}}$ |
| 17 | 2 | 4 | +1 | −1 | +1 | $e^{j2\pi\frac{1}{3}}$ | $e^{j2\pi\frac{2}{3}}$ |

As shown in Table 12 to 15, for the fourth category of DMRS port, one $w_t(l')$ can be determined, where the another $w_t(l')$ is [1,1,1]. Because it shares the same sequence as the first category of DMRS port, so the DMRS port number of the first category of DMRS port and some of the fourth category of DMRS port share same DMRS port number because their sequence are same. For example, the DMRS port 0-7 of type I and the DMRS port 0-11 of type II may share same DMRS port number. The actual category of the DMRS port 0-7 of type I and the DMRS port 0-11 of type II is up to gNB implementation and depends on the total layers allocated for the MU UEs.

The DMRS Table, which includes mapping between the value of bit field in the DCI and the first DMRS parameter, is selected by DMRS type, maximum of OFDM symbols in one DMRS OFDM symbol group, a second parameter, the number of DMRS ports and the total number of DMRS OFDM symbol groups of one PUSCH. The second parameter can be named as new table selection parameter, or the maximum of DMRS OFDM symbol groups in one TD-OCC. The second parameter is a 1 bit parameter. If the second parameter is configured (or is configured with value 1), the DMRS Table may include at least one of the DMRS ports {8-15} for type I and the DMRS Table may include at least one of the DMRS ports {12-23} for type II. If the second parameter is configured (or is configured with value 1), the enabled DMRS port may be as shown in Table 8, otherwise the enabled DMRS port may be as shown in Table 16.

The total number of DMRS OFDM symbol groups may be determined by the number of $\bar{l}$ as shown in Table 2 Table 3, or Table 4. For example, for DMRS type I, if the total number of DMRS OFDM symbol groups belongs to{ 1,2,4}, then a DMRS Table which includes the first category DMRS port and a third category DMRS port is selected for each number of DMRS ports. If the total number of DMRS OFDM symbol groups belongs to {3}, then another DMRS Table includes the first category DMRS port and a fourth category DMRS port is selected for one number of DMRS ports. In another implementation, for example, for DMRS type I and for one number of DMRS ports, the total number of DMRS OFDM symbol groups {1}, {2,4} and {3} may be associated with a first, a second and a third DMRS Table respectively. The first DMRS Table may include the first category DMRS port. The second DMRS may include the first category DMRS port and the third category DMRS port.

The third DMRS may include the first category DMRS port and the fourth category DMRS port. The total number of DMRS OFDM symbol groups may be equals to 3 may exist in the case where the number of OFDM symbols in one OFDM symbol group is 1.

TABLE 16

| The number of OFDM symbol in | | Supported antenna ports $\tilde{p}$ | |
|---|---|---|---|
| one DMRS OFDM symbol group | l' | Configuration type I | Configuration type II |
| single-symbol DM-RS | 0 | 0-3 | 0-5 |
| double-symbol DM-RS | 0, 1 | 0-7 | 0-11 |

For example, the DMRS Table is selected as shown in Table 17

TABLE 17

| The maximum number of symbols in one DMRS OFDM symbol group | The number of Layers Y | Total number of DMRS OFDM groups | Second parameter | DMRS type I | DMRS type II |
|---|---|---|---|---|---|
| 1 | 1 | 1/2/3/4 | 0 | Table n1 | Table n5 |
| | 2 | 1/2/3/4 | 0 | Table n2 | Table n6 |
| | 3 | 1/2/3/4 | 0 | Table n3 | Table n7 |
| | 4 | 1/2/3/4 | 0 | Table n4 | Table n8 |
| | 1 | 1 | 1 | Table n1 | Table n5 |
| | 2 | 1 | 1 | Table n2 | Table n6 |
| | 3 | 1 | 1 | Table n3 | Table n7 |
| | 4 | 1 | 1 | Table n4 | Table n8 |
| | 1 | 2/4 | 1 | Table n9 | Table n13 |
| | 2 | 2/4 | 1 | Table n10 | Table n14 |
| | 3 | 2/4 | 1 | Table n11 | Table n15 |
| | 4 | 2/4 | 1 | Table n12 | Table n16 |
| | 1 | 3 | 1 | Table n17 | Table n21 |
| | 2 | 3 | 1 | Table n18 | Table n22 |
| | 3 | 3 | 1 | Table n19 | Table n23 |
| | 4 | 3 | 1 | Table n20 | Table n24 |
| 1 | 1 | 1/2/3/4 | 0 | Table n25 | Table n29 |
| | 2 | 1/2/3/4 | 0 | Table n26 | Table n30 |
| | 3 | 1/2/3/4 | 0 | Table n27 | Table n31 |
| | 4 | 1/2/3/4 | 0 | Table n28 | Table n32 |
| | 1 | 1/2 | 1 | Table n33 | Table n37 |
| | 2 | 1/2 | 1 | Table n34 | Table n38 |
| | 3 | 1/2 | 1 | Table n35 | Table n39 |
| | 4 | 1/2 | 1 | Table n36 | Table n40 |

In some implementation, the DMRS table which includes mapping between the value of bit field in DCI and the first DMRS parameter is selected by DMRS type, maximum of OFDM symbols in one DMRS OFDM symbol group, the second parameter and the number of DMRS ports. Then one DMRS Table may include the first category DMRS port, the third category DMRS port and the fourth category DMRS port. Then the DMRS port number 8~15 may be replaced with 16~23 in Table 12 and Table 13 and the DMRS port number 12~17 may be replaced with 24-29 in Table 14 and Table 15. Example mapping between DMRS port number and a second DMRS parameter is shown in Table 14. The DMRS parameter may include DMRS type and number of OFDM symbols in one DMRS OFDM symbol group.

For example, the DMRS Table is selected as shown in Table 18. The DMRS port number 8-15 for type I (or the DMRS port number 12-23 for type II) may be shared between the third category DMRS port and the fourth category DMRS ports as shown in Table 5, 6, 12 and 13 for type I, or Table 7, 14 and 15. The category of the DMRS port 8-15 for type I (or the DMRS port from 12-23 for type II) may depend on the total number of DMRS OFDM groups which is determined according to the duration $l_d$ of PUSCH and the number of additional DMRS position. For example, for DMRS type I, if the UE is indicated with DMRS port 8 and 9 and the total number of DMRS OFDM symbol groups is 3, then the DMRS port 8 and 9 may the fourth category DMRS port as shown in Table 4. If the UE is indicated with DMRS port 8 and 9 and the total number of DMRS OFDM symbol groups is 2/4, then the DMRS port 8 and 9 may the third category DMRS port as shown in Table 5 or 6.

TABLE 18

| The maximum number of symbols in one DMRS OFDM symbol group | The number of Layers Y | Second parameter | DMRS type I | DMRS type II |
|---|---|---|---|---|
| 1 | 1 | 0 | Table n1 | Table n5 |
| | 2 | 0 | Table n2 | Table n6 |
| | 3 | 0 | Table n3 | Table n7 |
| | 4 | 0 | Table n4 | Table n8 |
| | 1 | 1 | Table n9 | Table n13 |
| | 2 | 1 | Table n10 | Table n14 |
| | 3 | 1 | Table n11 | Table n15 |
| | 4 | 1 | Table n12 | Table n16 |
| 2 | 1 | 0 | Table n25 | Table n29 |
| | 2 | 0 | Table n26 | Table n30 |
| | 3 | 0 | Table n27 | Table n31 |
| | 4 | 0 | Table n28 | Table n32 |
| | 1 | 1 | Table n33 | Table n37 |
| | 2 | 1 | Table n34 | Table n38 |
| | 3 | 1 | Table n35 | Table n39 |
| | 4 | 1 | Table n36 | Table n40 |

In above implementation, the DMRS port are shared between the first category of DMRS port and the fourth category of DMRS port, the category of DMRS port may depend on the total DMRS OFDM symbol of one transmission occasion of the PUSCH. In another implementation, if one DMRS Table includes the first category DMRS port, the third category DMRS port and the fourth category DMRS port, then the DMRS port number between the third category and the fourth category aren't shared and are different, then the DMRS port number 8~15 may be replaced with 16~23 in Table 12 and Table 13 and the DMRS port number 12~17 may be replaced with 24-29 in Table 14 and Table 15. The mapping between DMRS port number and a second DMRS parameter is shown in Table 14. The DMRS parameter includes DMRS type and number of OFDM symbols in one DMRS OFDM symbol group.

TABLE 19

| The number of OFDM symbol in | | Supported antenna ports $\tilde{p}$ | |
|---|---|---|---|
| one DMRS OFDM symbol group | l' | Configuration type I | Configuration type II |
| single-symbol DM-RS | 0 | 0-3, 8-11, 16-19 | 0-5, 12~17 |
| double-symbol DM-RS | 0, 1 | 0-7, 8~15 | 0-11, 12~23 |

31

Then for DMRS type I and maximum of OFDM symbols in one DMRS OFDM symbols 1 and Y DMRS ports, the DMRS Table may indicate Y DMRS ports from {0-3,8-11, 16-19} is indicated by DCI. The DMRS Table may include a mapping between value of DMRS bit filed in DCI and a second DMRS parameter. The second DMRS parameter may include a number of CDM group without data and Y DMRS ports from {0-3,8-11,16-19}.

In some implementation, the X DMRS OFDM symbol groups are in one slot wherein the X can be one of {2,3}. In another implementation, the X DMRS OFDM symbol groups are in more than one slot. The more than one slot can be consecutive slot. The more than one slots can be consecutive available slot. An available slot may satisfy some condition. For example, the condition includes that there is no OFDM symbol of the scheduled PUSCH is downlink OFDM symbol. The condition includes that there is no OFDM symbol of the scheduled PDSCH is uplink OFDM symbol.

As shown in one of Table 2-3, in some cases, the total number of DMRS OFDM symbol groups is one. For example, the $\bar{l}$ includes $l_0$ when the duration $l_d$ belongs to {4,5,6,7} for PUSCH mapping type A. The gNB may not allocate third category DMRS port to the UE in this case.

The fourth category DMRS port may apply for the case where the number of OFDM symbols in one DMRS OFDM symbol group is 1 and the total number of DMRS OFDM symbols groups.

In some implementation, the UE receives one value of the DMRS table from gNB in signaling. The UE may get the first parameter according to one value and the DMRS table. The signaling may include one of DCI which triggers the PUSCH, RRC signaling which configures the PUSCH, or MAC-CE which activates the PUSCH.

In some implementations, one DMRS Table may include multiple categories of DMRS ports. Different categories of DMRS ports can correspond to different numbers of continuous DMRS OFDM symbols in one DMRS OFDM symbol group. The TD-OCCs of the multiple categories of DMRS ports can correspond to a same number of DMRS OFDM symbol groups. For example, the TD-OCCs of the multiple categories of DMRS ports can correspond to one DMRS OFDM symbol group. There may be a first category DMRS port with a TD-OCC corresponding to one continuous DMRS OFDM symbol, a second category DMRS port with a TD-OCC corresponding to two continuous DMRS OFDM symbols, and a third category DMRS port with a TD-OCC corresponding to four continuous DMRS OFDM symbols.

Example 2

For DMRS of PDSCH, one DMRS Table may include multiple categories of DMRS ports. The multiple categories of DMRS ports correspond to different numbers of DMRS OFDM groups in one TD-OCC. Each OFDM group may include one or more consecutive OFDM symbols. For example, the one OFDM group includes one or two consecutive OFDM. Different OFDM groups may include non consecutive OFDM symbols. In one aspect, the gap between two DMRS OFDM symbol group is larger than 0.

The DMRS Table includes mapping between a value of DMRS bit field in DCI and a first DMRS parameter.

In some implementation, one DMRS Table includes a first category DMRS port and a third category DMRS port.

For the first category DMRS port and type I, the UE may obtain the sequence of a DMRS port according to following equation (1) and Table 1 except the $\bar{l}$ is based on Table 20 or Table 21.

For DMRS of PDSCH, the reference point for 1 and the position $l_0$ of the first DM-RS symbol in equation 1 to 5 may depend on the mapping type. For PDSCH mapping type A, 1 is defined or determined relative to the start of the slot, and $l_0=3$ if the higher-layer parameter dmrs-TypeA-Position is equal to 'pos3' and $l_0=2$. For PDSCH mapping type B: 1 is defined relative to the start of the scheduled PDSCH resources and $l_0=0$.

The position(s) of the DM-RS symbols may be given by $\bar{l}$ and duration $l_d$. For example, for PDSCH mapping type A, $l_d$ may be the duration between the first OFDM symbol of the slot and the last OFDM symbol of the scheduled PDSCH resources in the slot. For PDSCH mapping type B, $l_d$ may be the duration of the scheduled PDSCH resources. Table 20 may be applicable for the case where the number of OFDM symbols in one DMRS OFDM symbol group is 1 and Table 21 may be applicable for the case where the number of OFDM symbols in one DMRS OFDM symbol group is 2. In some embodiments, $l_1$ is 11 or 12 which depends on higher layer configuration.

TABLE 20

| | DM-RS positions $\bar{l}$ | | | | | | | |
| | PDSCH mapping type A dmrs-AdditionalPosition | | | | PDSCH mapping type B dmrs-AdditionalPosition | | | |
| $l_d$ in symbols | pos0 | pos1 | pos2 | pos3 | pos0 | pos1 | pos2 | pos3 |
|---|---|---|---|---|---|---|---|---|
| 2 | — | — | — | — | $l_0$ | $l_0$ | $l_0$ | $l_0$ |
| 3 | $l_0$ | $l_0$ | $l_0$ | $l_0$ | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0,4$ | $l_0,4$ | $l_0,4$ |
| 6 | $l_0$ | $l_0$ | $l_0$ | $l_0$ | $l_0$ | $l_0,4$ | $l_0,4$ | $l_0,4$ |
| 7 | $l_0$ | $l_0$ | $l_0$ | $l_0$ | $l_0$ | $l_0,4$ | $l_0,4$ | $l_0,4$ |
| 8 | $l_0$ | $l_0,7$ | $l_0,7$ | $l_0,7$ | $l_0$ | $l_0,6$ | $l_0,3,6$ | $l_0,3,6$ |
| 9 | $l_0$ | $l_0,7$ | $l_0,7$ | $l_0,7$ | $l_0$ | $l_0,7$ | $l_0,4,7$ | $l_0,4,7$ |
| 10 | $l_0$ | $l_0,9$ | $l_0,6,9$ | $l_0,6,9$ | $l_0$ | $l_0,7$ | $l_0,4,7$ | $l_0,4,7$ |
| 11 | $l_0$ | $l_0,9$ | $l_0,6,9$ | $l_0,6,9$ | $l_0$ | $l_0,8$ | $l_0,4,8$ | $l_0,3,6,9$ |
| 12 | $l_0$ | $l_0,9$ | $l_0,6,9$ | $l_0,5,8,11$ | $l_0$ | $l_0,9$ | $l_0,5,9$ | $l_0,3,6,9$ |
| 13 | $l_0$ | $l_0,l_1$ | $l_0,7,11$ | $l_0,5,8,11$ | $l_0$ | $l_0,9$ | $l_0,5,9$ | $l_0,3,6,9$ |
| 14 | $l_0$ | $l_0,l_1$ | $l_0,7,11$ | $l_0,5,8,11$ | — | — | — | — |

TABLE 21

| | DM-RS positions $\bar{l}$ | | | | | |
| | PDSCH mapping type A dmrs-AdditionalPosition | | | PDSCH mapping type B dmrs-AdditionalPosition | | |
| $l_d$ in symbols | pos0 | pos1 | pos2 | pos0 | pos1 | pos2 |
|---|---|---|---|---|---|---|
| <4 | | | | — | — | |
| 4 | $l_0$ | $l_0$ | | — | — | |
| 5 | $l_0$ | $l_0$ | | $l_0$ | $l_0$ | |
| 6 | $l_0$ | $l_0$ | | $l_0$ | $l_0$ | |
| 7 | $l_0$ | $l_0$ | | $l_0$ | $l_0$ | |
| 8 | $l_0$ | $l_0$ | | $l_0$ | $l_0,5$ | |
| 9 | $l_0$ | $l_0$ | | $l_0$ | $l_0,5$ | |
| 10 | $l_0$ | $l_0,8$ | | $l_0$ | $l_0,7$ | |
| 11 | $l_0$ | $l_0,8$ | | $l_0$ | $l_0,7$ | |

TABLE 21-continued

| | DM-RS positions $\bar{l}$ | | | | | |
|---|---|---|---|---|---|---|
| | PDSCH mapping type A dmrs-AdditionalPosition | | | PDSCH mapping type B dmrs-AdditionalPosition | | |
| $l_d$ in symbols | pos0 | pos1 | pos2 | pos0 | pos1 | pos2 |
| 12 | $l_0$ | $l_0$, 8 | | $l_0$ | $l_0$, 8 | |
| 13 | $l_0$ | $l_0$, 10 | | $l_0$ | $l_0$, 8 | |
| 14 | $l_0$ | $l_0$, 10 | | — | — | |

For the third category and type I DMRS port, the UE may obtain the sequence of a DMRS port according to following equation (1) or (2) and Table 5 except the $\bar{l}$ may be based on Table 20 or Table 21.

Alternative, for DMRS type I, the first category DMRS port and the third category DMRS port can be combined together which follows equation (1) and Table 6 except the $\bar{l}$ may be based on Table 20 or Table 21 for type I.

For the third category and DMRS type II DMRS port, the UE may obtain the sequence of a DMRS port according to following equation (3) and Table 7 except the $\bar{l}$ may be based on Table 20 or Table 21.

In some implementation, one DMRS Table includes the first category DMRS port and the fourth category DMRS port.

For the fourth category and DMRS type I DMRS port, the UE may get the sequence of a DMRS port according to following equation (4) and Table 12 or Table 13 except the $\bar{l}$ may be based on Table 20 or Table 21.

For the fourth category and DMRS type II DMRS port, the UE may get the sequence of a DMRS port according to following equation (5) and Table 14 or Table 15 except the $\bar{l}$ may be based on Table 20 or Table 21

In some implementation, one DMRS Table includes a first category DMRS port, a third category DMRS port and a fourth category DMRS port. The third category and the fourth category may share same DMRS port. The category of the DMRS port may depend on the total number of DMRS OFDM symbol groups of one transmission occasion of the PDSCH.

The DMRS Table may be selected by DMRS type, maximum of OFDM symbols in one DMRS OFDM group and a second parameter. The second parameter may be a 1 bit parameter. If the second parameter is configured (or is configured with value 1), the DMRS Table includes the first category and the third category DMRS port are enabled, such as the DMRS Table including at least one of the DMRS ports {8-15} for type I and the DMRS Table including at least one of the DMRS ports {12-23} for type II are enabled. If the second parameter isn't configured (or is configured with value 0), the DMRS Table may include the first category DMRS port are enabled. If the second parameter is configured (or is configured with value 1), the mapping between the third DMRS parameter and DMRS port may be as shown in Table 8, otherwise the mapping between the third DMRS parameter and DMRS port may be as shown in Table 16. In one aspect, the second parameter is used to enable or disable new DMRS ports. If the second parameter is configured (or is configured with value 1), the second category DMRS ports such as the third category DMRS port or the fourth category DMRS port may be enabled, otherwise only the first category of DMRS port may be enabled.

Unlike DMRS Table of PUSCH, the DMRS Table of PDSCH may not be selected by the number of DMRS ports.

One DMRS Table of PDSCH may include different entries including different number of DMRS port.

For example, the DMRS Table of PDSCH may be selected as shown in Table 22. Table m1 to m4 may correspond to first category DMRS port. For Table m1 and m2, the first parameter includes the number of CDM groups without data, and the DMRS port number. One DMRS Table includes different entries which include different numbers of the DMRS port number. The UE also gets the number of DMRS ports from the Table and a value indicated in the DCI. In Table m1, Y DMRS ports are selected from DMRS ports 0 to 3 as shown in Table 1 and Y includes 1, 2, 3 and 4. Only one code-word can be enabled when Table m1 is selected. In Table m2, Y DMRS ports are selected from DMRS ports 0 to 5 as shown in Table 7 and Y includes 1, 2, 3, 4, 5 and 6.

For Table m3 and m4, the first parameter includes the number of CDM groups without data, the DMRS port number, and the number of symbols in one DMRS OFDM symbol group. In Table m3, Y DMRS ports are selected from DMRS ports 0 to 7 as shown in Table 1 and Y includes 1, 2, 3, 4, 5, 6, 7 and 8. One code-word can be enable when Table m1 is selected. In Table m4, Y DMRS ports can be selected from DMRS ports 0 to 11 as shown in Table 7 and Y includes 1, 2, 3, 4, 5, 6, 7 and 8.

TABLE 22

| Second parameter | The maximum number of symbols in one DMRS OFDM symbol group | DMRS type I | DMRS type II |
|---|---|---|---|
| 0 | 1 | Table m1 | Table m3 |
| | 2 | Table m2 | Table m4 |
| 1 | 1 | Table m5 | Table m7 |
| | 2 | Table m6 | Table m8 |

For Table m5 and Table m7, the first parameter may include the number of CDM groups without data, the DMRS port number and the number of DMRS ports. The first parameter can further include third DMRS parameter, and the third DMRS parameter may include at least one of length of a TD-OCC of a DMRS port in a first DMRS set, the DMRS port of co-scheduled UEs. As shown in Table 6 or 7, the DMRS port number/index may be shared between the first category, the third category and the fourth category. For example, the DMRS port 0-7 of type I (or the DMRS port 0-11 of type II) share the same DMRS port number between the first category of DMRS port and the second or the fourth category of DMRS port. The length of TD-OCC of the DMRS port 0-7 of type I (the length of TD-OCC of the DMRS port 0-11 of type II) can be further indicated in the DMRS Table. The first DMRS set can include DMRS ports 0-7 of type I or DMRS ports 0-11 of type II. An example of Table m5 is shown in Table 23. As shown in the Table 23, the third DMRS parameter can be named as whether the number of DMRS OFDM symbol groups of one TD-OCC is larger than one. If the third DMRS parameter is determined to be 1, then there can be more than one DMRS OFDM symbol groups of one TD-OCC. If the DMRS Table only includes the first category of DMRS port and the third category of DMRS port and doesn't include the fourth category of DMRS port and the third DMRS parameter is determined to be 1, then the number of DMRS OFDM symbols groups of one TD-OCC can be 2, the length of the TD-OCC equals 2 multiplied by the number of symbols in one DMRS OFDM symbols. If the DMRS Table includes the first category of DMRS port, the third category of DMRS port and include the fourth category of DMRS port and the third DMRS parameter is determined to be 1, then the number of DMRS OFDM symbols groups of one TD-OCC can be 2 or 3 which is further determined by the total number of DMRS OFDM symbol groups of one transmission occasion, the length of the TD-OCC equals 2 or 3 multiplied by the number of symbols in one DMRS OFDM symbols. Alternatively, for PUSCH, the first category DMRS port and the second category DMRS may share same DMRS index, but for PDSCH, the first category DMRS port and the second category DMRS may not share the same DMRS index and have different DMRS indices. The length of a TD-OCC can be obtained based on the index of DMRS port.

In Table m5, Y DMRS ports may be selected from DMRS ports {0-3, 8-11} as shown in Table 6 and Y may include 1, 2, 3, 4, 5, 6, 7 and 8. Up to two code-words can be enabled when Table m5 is selected. In Table m6, Y DMRS ports are selected from DMRS ports {0-5, 12-17} as shown in Table 7 and Y may include 1,2,3,4,5,6,7 and 8.

In Table m7, Y DMRS ports may be selected from DMRS ports 0 to 15 as shown in Table 6 and Y may include 1, 2, 3, 4, 5, 6, 7 and 8. Up to two code-words can be enabled when Table m5 is selected. In Table m8, Y DMRS ports may be selected from DMRS ports 0 to 23 as shown in Table 7 and Y may include 1, 2, 3, 4, 5, 6, 7 and 8.

The UE can also determine that the set of DMRS ports including potential co-scheduled UE according to the third DMRS parameter. For example, for the value 0 of one codeword as shown in Table 23, the UE may assume that the potential co-scheduled UE may be allocated with DMRS port 1, but for the value 12 of one codeword as shown in Table 23, the UE may assume that the potential co-scheduled UE may be allocated with DMRS port 1, 8, 9. The set of DMRS ports containing potential co-scheduled UEs may be determined by the third parameter. The set may include the first category DMRS port if the third parameter is 0. The set may include the third category DMRS port if the third parameter is 1.

TABLE 23

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Whether the number of DMRS OFDM symbol groups of one TD-OCC is larger than one | Value | Number of DMRS CDM group(s) without data | DMRS port(s) | Whether the number of DMRS OFDM symbol groups of one TD-OCC is larger than one |
| 0 | 1 | 0 | 0 | 0 | 2 | 0, 1, 2, 3, 8 | 1 |
| 1 | 1 | 1 | 0 | 1 | 2 | 0, 1, 2, 3, 8, 9 | 1 |
| 2 | 1 | 0, 1 | 0 | 2 | 2 | 0, 1, 2, 3, 8, 9, 10 | 1 |
| 3 | 2 | 0 | 0 | 3 | 2 | 0, 1, 2, 3, 8, 9, 10, 11 | 1 |
| 4 | 2 | 1 | 0 | 4-63 | reserved | reserved | reserved |
| 5 | 2 | 2 | 0 | | | | |
| 6 | 2 | 3 | 0 | | | | |
| 7 | 2 | 0, 1 | 0 | | | | |
| 8 | 2 | 2, 3 | 0 | | | | |
| 9 | 2 | 0-2 | 0 | | | | |
| 10 | 2 | 0-3 | 0 | | | | |
| 11 | 2 | 0, 2 | 0 | | | | |
| 12 | 1 | 0 | 1 | | | | |
| 13 | 1 | 1 | 1 | | | | |
| 14 | 1 | 0, 1 | 1 | | | | |
| 15 | 2 | 0 | 1 | | | | |
| 16 | 2 | 1 | 1 | | | | |
| 17 | 2 | 2 | 1 | | | | |
| 18 | 2 | 3 | 1 | | | | |
| 19 | 2 | 0, 1 | 1 | | | | |
| 20 | 2 | 2, 3 | 1 | | | | |
| 21 | 2 | 0-2 | 1 | | | | |
| 22 | 2 | 0-3 | 1 | | | | |
| 23 | 2 | 0, 2 | 1 | | | | |
| 24 | 2 | 8 | 1 | | | | |
| 25 | 2 | 9 | 1 | | | | |
| 26 | 2 | 10 | 1 | | | | |
| 27 | 2 | 11 | 1 | | | | |
| 28 | 2 | 8, 9 | 1 | | | | |
| 29 | 2 | 10, 11 | 1 | | | | |
| 30 | 2 | 8, 9, 11 | 1 | | | | |
| 31 | 2 | 8, 9, 10, 11 | 1 | | | | |
| 32 | 1 | 0, 1, 8, 9 | 1 | | | | |
| 33-63 | reserved | reserved | reserved | | | | |

The first DMRS parameter can include a fourth DMRS parameter which includes at least one of the length of TD-OCC of DMRS ports in each CDM group without data, the number of DMRS OFDM symbol groups included in one TD-OCC in each CDM group without data, a relationship between lengths of TD-OCCs of DMRS ports in different CDM group without data, or a relationship between numbers of DMRS OFDM symbol groups included in one TD-OCC in different CDM group without data. The UE may obtain DMRS ports of potential co-scheduled UE based on the fourth parameter. For example, for the value 15 to 23 of one code word in Table 23, the set of DMRS port including potential co-scheduled UEs in CDM group 1 may include the first category of DMRS port in CDM group 1 such as DMRS port{2,3} or may include the third category of DMRS port in CDM group 1 such as DMRS port{2,3,10, 11}. It may be further indicated by the fourth DMRS parameter. The length of TD-OCC of DMRS ports equals the number of DMRS OFDM symbol groups included in one TD-OCC multiplied by the number of OFDM symbols in one DMRS OFDM symbol group.

In some implementation, the first parameter doesn't include the fourth DMRS parameter, and the UE may determine that the same length of TD-OCC is used for different CDM groups. For example, for the value 15 to 23 of one code word in Table 23, the TD-OCC length the set of DMRS port including potential co-scheduled UEs in CDM group 1 may include the third category of DMRS port in CDM group 1 such as DMRS port{2,3,10,11} because the length of TD-OCC in CDM group 1 may be same as in the CDM group 0, that is the length of TD-OCC equals 2.

For Table m6 and Table m8, the first parameter may include the number of CDM groups without data, the DMRS port number, the number of symbols in one OFDM symbol group. The first DMRS parameter can further include the third DMRS parameter and/or the fourth DMRS parameter.

The second parameter for uplink DMRS port and downlink DMRS port can be separately configured or joint configured. When they are separately configured, there may be two independent configuration of the second parameter for the uplink DMRS port and the downlink DMRS port respectively.

In some implementations, one DMRS Table may include multiple categories of DMRS ports. Different categories of DMRS ports can correspond to different numbers of continuous DMRS OFDM symbols in one DMRS OFDM symbol group. The TD-OCCs of the multiple categories of DMRS ports can correspond to a same number of DMRS OFDM symbol groups. For example, the TD-OCCs of the multiple categories of DMRS ports can correspond to one DMRS OFDM symbol group. There can be a first category DMRS port with a TD-OCC corresponding to one continuous DMRS OFDM symbol, a second category DMRS port with a TD-OCC corresponding to two continuous DMRS OFDM symbols, and a third category DMRS port with a TD-OCC corresponding to four continuous DMRS OFDM symbols.

Figure 5:
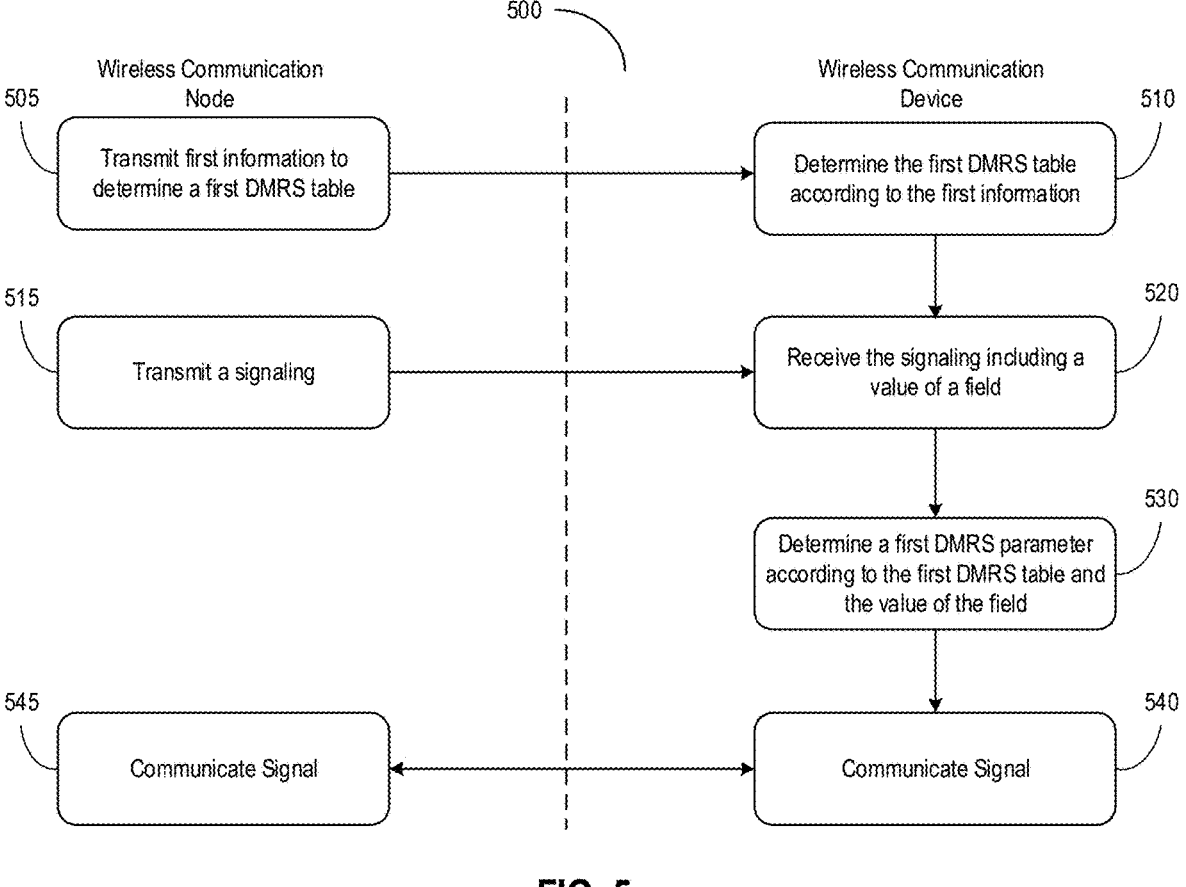
FIG. 5 illustrates a flow diagram of an example method for communicating according to DMRS port indication based on DMRS table, in accordance with an embodiment of the present disclosure.

FIG. 5 illustrates a flow diagram of a method 500 for communication according to DMRS port indication based on DMRS table, in accordance with an embodiment of the present disclosure. The method 500 may be implemented using any of the components and devices detailed herein in conjunction with FIGS. 1-4. In brief overview, a wireless communication node may transmit first information for the wireless communication device to determine a first DMRS table (505). The wireless communication device may receive the first information, and determine the first DMRS table according to the first information (510). The wireless communication node may transmit signaling including to the wireless communication device (515). The wireless communication device may receive the signaling including a value of a field (520). The wireless communication device may determine a first DMRS parameter according to the first DMRS table and the value of the field (530). The wireless communication device may communicate a signal with the communication node (540 and 545).

In further detail, the wireless communication node may transmit first information for the wireless communication device to determine a first DMRS table (505). The first information may include at least one of: a DMRS type between type I and type II, a maximum number of OFDM symbols in one DMRS OFDM symbol group, a second DMRS parameter, a total number of OFDM symbol groups included in one transmission occasion, or a number of DMRS ports.

The wireless communication device may receive the first information, and determine the first DMRS table according to the first information (510). In one aspect, the wireless communication device stores a plurality of DMRS tables. According to the first information, the wireless communication device may determine the first DMRS table. For example, the wireless communication device may determine the first DMRS table, according to at least one of the DMRS type between type I and type II, the maximum number of OFDM symbols in one DMRS OFDM symbol group, the second DMRS parameter, the total number of OFDM symbol groups included in one transmission occasion, the number of DMRS ports. In one aspect, the first DMRS table includes a mapping between values of the field of the signaling and values of the first DMRS parameter. Each of the values of the field may be associated with a respective one of the values of the first DMRS parameter. In one aspect, the first DMRS table includes the first DMRS parameter, that has values associated with at least two categories of DMRS ports. In one aspect, some values of the first DMRS parameter are associated with one category. Other values may be associated with multiple categories. Different categories of the at least two categories of DMRS ports may correspond to at least one of: different numbers of DMRS orthogonal frequency division multiplexing (OFDM) symbol groups of one time domain orthogonal cover code (TD-OCC), different numbers of DMRS OFDM symbols of one TD-OCC, different numbers of DMRS OFDM symbols in one DMRS OFDM symbol group of one TD-OCC, or different relationships between vectors of one TD-OCC. Each DMRS OFDM symbol group may include one or more consecutive OFDM symbols.

The wireless communication node may transmit signaling to the wireless communication device (515). Examples of the signaling include downlink control information (DCI) signaling, radio access control (RRC) signaling, or medium access control control element (MAC-CE) signaling. The wireless communication device may receive the signaling (520). The signaling may include one or more fields.

The wireless communication device may determine a first DMRS parameter according to the first DMRS table and the value of the field (530). In some embodiments, a number of bits in the field is indicated by or determined according to the first DMRS information. Hence, the wireless communication device may receive the signal, and determine, detect, or identify a field according to the number of bits as indicated by the first DMRS information. The wireless communication device may apply the value of the field to the first DMRS table as an index, and determine, obtain, or identify the first DMRS parameter stored in an entry of the first DMRS table associated with index.

The wireless communication device may communicate a signal with the communication node (540 and 545). For example, the wireless communication device may select, control, or configure a DMRS port, according to the first DMRS parameter. Through the determined DMRS port, the wireless communication device and the wireless communication node may communicate with each other. For example, the wireless communication device transmits a signal on PUSCH using the determined DMRS port, or receives a signal on PDSCH according to the determined DMRS port and/or the determined first DMRS parameter. The wireless communication device can get information/DMRS ports of potential co-scheduled wireless communication devices of the wireless communication device to decode the signal on the PDSCH according to the first DMRS parameter. For example, the wireless communication device can get/receive interference from potential co-scheduled wireless communication devices of the wireless communication device, to decode the signal on the PDSCH according to the determined first DMRS parameter.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:
determining, by a wireless communication device, a first demodulation reference signal (DMRS) table according to first information from a wireless communication node;
receiving, by the wireless communication device, a value of a field in a signaling from the wireless communication node; and
determining, by the wireless communication device, a first DMRS parameter according to the first DMRS table and the value of the field,
wherein the first DMRS table includes a mapping between values of the field of the signaling and values of the first DMRS parameter, and each of the values of the field is associated with a respective one of the values of the first DMRS parameter,
wherein the first DMRS table includes the first DMRS parameter of at least two categories of DMRS ports, and different categories of the at least two categories of DMRS ports correspond to at least one of: different numbers of DMRS orthogonal frequency division multiplexing (OFDM) symbol groups of one time domain orthogonal cover code (TD-OCC), different numbers of DMRS OFDM symbols of one TD-OCC, different numbers of DMRS OFDM symbols in one DMRS OFDM symbol group of one TD-OCC, or different relationships between vectors of one TD-OCC, and
wherein each of the DMRS OFDM symbol groups includes one or more consecutive OFDM symbols.

2. The method of claim 1, wherein the at least two categories of DMRS ports include a first category DMRS port and a second category DMRS port,
wherein a TD-OCC of the first category DMRS port corresponds to one DMRS OFDM symbol group and the second category DMRS port corresponds to X DMRS OFDM symbol groups, wherein X is an integer value larger than 1.

3. The method of claim 1, wherein the first DMRS parameter includes Y DMRS ports and a number of CDM groups without data, wherein at least one of:
the number of CDM groups without data is determined according to at least one of: a category of the Y DMRS ports, or a relationship between elements of one TD-OCC; or
values of the first DMRS parameter of the first DMRS table do not include a first value of the number of CDM groups without data and a DMRS port of a second category.

4. The method of claim 1, wherein at least one of:
a number of bits in the field is determined by the first information; or
the first DMRS table is selected from multiple tables according to the first information.

5. The method of claim 1, wherein at least one of:
the at least two categories of DMRS ports are indexed together;
indices of DMRS ports are determined by first indexing across DMRS ports of a first category, then indexing across DMRS ports of a second category, or
the first category DMRS ports and some of the second category DMRS ports share same DMRS port indices.

6. A method comprising:
sending, by a wireless communication node to a wireless communication device, first information to determine a first demodulation reference signal (DMRS) table; and
sending, by the wireless communication node, a value of a field in a signaling to the wireless communication device,
wherein the value of the field is for use by the wireless communication device to determine a first DMRS parameter according to the first DMRS table and the value of the field,
wherein the first DMRS table includes a mapping between values of the field of the signaling and values of the first DMRS parameter, and each of the values of the field is associated with a respective one of the values of the first DMRS parameter,
wherein the first DMRS table includes the first DMRS parameter, that is of at least two categories of DMRS ports, and different categories of the at least two categories of DMRS ports correspond to at least one of: different numbers of DMRS orthogonal frequency division multiplexing (OFDM) symbol groups of one time domain orthogonal cover code (TD-OCC), different numbers of DMRS OFDM symbols of one TD-OCC, different numbers of DMRS OFDM symbols in one DMRS OFDM symbol group of one TD-OCC, or different relationships between vectors of one TD-OCC, and
wherein each of the DMRS OFDM symbol groups includes one or more consecutive OFDM symbols.

7. The method of claim 6, wherein the at least two categories of DMRS ports include a first category DMRS port and a second category DMRS port,
wherein a TD-OCC of the first category DMRS port corresponds to one DMRS OFDM symbol group and the second category DMRS port corresponds to X DMRS OFDM symbol groups, wherein X is an integer value larger than 1.

8. The method of claim 6, wherein the first DMRS parameter includes Y DMRS ports and a number of CDM groups without data, wherein at least one of:
the number of CDM groups without data is determined according to at least one of: a category of the Y DMRS ports, or a relationship between elements of one TD-OCC; or
values of the first DMRS parameter of the first DMRS table do not include a first value of the number of CDM groups without data and a DMRS port of a second category.

9. The method of claim 6, wherein at least one of:
a number of bits in the field is determined by the first information; or
the first DMRS table is selected from multiple tables according to the first information.

10. The method of claim 6, wherein at least one of:
the at least two categories of DMRS ports are indexed together;

indices of DMRS ports are determined by first indexing across DMRS ports of a first category, then indexing across DMRS ports of a second category, or the first category DMRS ports and some of the second category DMRS ports share same DMRS port indices.

11. An apparatus comprising a processor and a memory storing instructions, execution of which by the processor causes the apparatus to:

determine a first demodulation reference signal (DMRS) table according to first information from a wireless communication node;

receive a value of a field in a signaling from the wireless communication node; and determine a first DMRS parameter according to the first DMRS table and the value of the field, wherein the first DMRS table includes a mapping between values of the field of the signaling and values of the first DMRS parameter, and each of the values of the field is associated with a respective one of the values of the first DMRS parameter, wherein the first DMRS table includes the first DMRS parameter of at least two categories of DMRS ports, and different categories of the at least two categories of DMRS ports correspond to at least one of: different numbers of DMRS orthogonal frequency division multiplexing (OFDM) symbol groups of one time domain orthogonal cover code (TD-OCC), different numbers of DMRS OFDM symbols of one TD-OCC, different numbers of DMRS OFDM symbols in one DMRS OFDM symbol group of one TD-OCC, or different relationships between vectors of one TD-OCC, and wherein each of the DMRS OFDM symbol groups includes one or more consecutive OFDM symbols.

12. The apparatus of claim 11, wherein the at least two categories of DMRS ports include a first category DMRS port and a second category DMRS port, wherein a TD-OCC of the first category DMRS port corresponds to one DMRS OFDM symbol group and the second category DMRS port corresponds to X DMRS OFDM symbol groups, wherein X is an integer value larger than 1.

13. The apparatus of claim 11, wherein the first DMRS parameter includes Y DMRS ports and a number of CDM groups without data, wherein at least one of:

the number of CDM groups without data is determined according to at least one of: a category of the Y DMRS ports, or a relationship between elements of one TD-OCC; or values of the first DMRS parameter of the first DMRS table do not include a first value of the number of CDM groups without data and a DMRS port of a second category.

14. The apparatus of claim 11, wherein at least one of:

a number of bits in the field is determined by the first information; or the first DMRS table is selected from multiple tables according to the first information.

15. The apparatus of claim 11, wherein at least one of:

the at least two categories of DMRS ports are indexed together;

indices of DMRS ports are determined by first indexing across DMRS ports of a first category, then indexing across DMRS ports of a second category, or the first category DMRS ports and some of the second category DMRS ports share same DMRS port indices.

16. An apparatus comprising at least one processor and a memory storing instructions, execution of which by the at least one processor causes the apparatus to:

send, to a wireless communication device, first information to determine a first demodulation reference signal (DMRS) table; and send a value of a field in a signaling to the wireless communication device, wherein the value of the field is for use by the wireless communication device to determine a first DMRS parameter according to the first DMRS table and the value of the field, wherein the first DMRS table includes a mapping between values of the field of the signaling and values of the first DMRS parameter, and each of the values of the field is associated with a respective one of the values of the first DMRS parameter, wherein the first DMRS table includes the first DMRS parameter, that is of at least two categories of DMRS ports, and different categories of the at least two categories of DMRS ports correspond to at least one of: different numbers of DMRS orthogonal frequency division multiplexing (OFDM) symbol groups of one time domain orthogonal cover code (TD-OCC), different numbers of DMRS OFDM symbols of one TD-OCC, different numbers of DMRS OFDM symbols in one DMRS OFDM symbol group of one TD-OCC, or different relationships between vectors of one TD-OCC, and wherein each of the DMRS OFDM symbol groups includes one or more consecutive OFDM symbols.

17. The apparatus of claim 16, wherein the at least two categories of DMRS ports include a first category DMRS port and a second category DMRS port, wherein a TD-OCC of the first category DMRS port corresponds to one DMRS OFDM symbol group and the second category DMRS port corresponds to X DMRS OFDM symbol groups, wherein X is an integer value larger than 1.

18. The apparatus of claim 16, wherein the first DMRS parameter includes Y DMRS ports and a number of CDM groups without data, wherein at least one of:

the number of CDM groups without data is determined according to at least one of: a category of the Y DMRS ports, or a relationship between elements of one TD-OCC; or values of the first DMRS parameter of the first DMRS table do not include a first value of the number of CDM groups without data and a DMRS port of a second category.

19. The apparatus of claim 16, wherein at least one of:

a number of bits in the field is determined by the first information; or the first DMRS table is selected from multiple tables according to the first information.

20. The apparatus of claim 16, wherein at least one of:

the at least two categories of DMRS ports are indexed together;

indices of DMRS ports are determined by first indexing across DMRS ports of a first category, then indexing across DMRS ports of a second category, or the first category DMRS ports and some of the second category DMRS ports share same DMRS port indices.

\* \* \* \* \*